(12) United States Patent
Zerbe et al.

(10) Patent No.: US 7,860,156 B2
(45) Date of Patent: Dec. 28, 2010

(54) SELECTABLE-TAP EQUALIZER

(75) Inventors: Jared L Zerbe, Woodside, CA (US);
Vladimir M Stojanovic, Stanford, CA (US); Fred F Chen, San Francisco, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 12/417,263

(22) Filed: Apr. 2, 2009

(65) Prior Publication Data
US 2009/0252213 A1 Oct. 8, 2009

Related U.S. Application Data

(60) Continuation of application No. 12/269,488, filed on Nov. 12, 2008, which is a division of application No. 11/871,666, filed on Oct. 12, 2007, now Pat. No. 7,508,871, which is a continuation of application No. 10/195,129, filed on Jul. 12, 2002, now Pat. No. 7,292,629.

(51) Int. Cl.
*H03H 7/30* (2006.01)
*H03H 7/40* (2006.01)
*H03K 5/159* (2006.01)

(52) U.S. Cl. .................. 375/229; 375/231; 375/232; 375/346; 375/350

(58) Field of Classification Search ......... 375/229–236, 375/346–350
See application file for complete search history.

(56) References Cited

U.S. PATENT DOCUMENTS

| | | | |
|---|---|---|---|
| 5,282,225 A | 1/1994 | Nikias et al. | |
| 5,659,609 A | 8/1997 | Koizumi et al. | |
| 5,671,252 A | * 9/1997 | Kovacs et al. | ............. 375/316 |
| 6,185,301 B1 | 2/2001 | Muraoka | |
| 6,687,235 B1 | 2/2004 | Chu | |
| 6,744,814 B1 | 6/2004 | Blanksby et al. | |
| 6,937,672 B1 * | 8/2005 | Novakov | .............. 375/340 |
| 7,113,540 B2 | 9/2006 | Yousef et al. | |
| 7,269,212 B1 * | 9/2007 | Chau et al. | ............... 375/229 |
| 7,292,629 B2 | 11/2007 | Zerbe et al. | |
| 2002/0095541 A1 * | 7/2002 | Cranford et al. | ............ 710/305 |
| 2002/0136231 A1 | 9/2002 | Leatherbury et al. | |

(Continued)

OTHER PUBLICATIONS

Non-Final Office Action dated Feb. 3, 2010, United States Patent & Trademark Office, U.S. Appl. No. 12/269,513, filed Nov. 12, 2008.

(Continued)

*Primary Examiner*—Curtis B Odom
(74) *Attorney, Agent, or Firm*—Vierra Magen Marcus & DeNiro LLP

(57) ABSTRACT

A signaling circuit having a selectable-tap equalizer. The signaling circuit includes a buffer, a select circuit and an equalizing circuit. The buffer is used to store a plurality of data values that correspond to data signals transmitted on a signaling path during a first time interval. The select circuit is coupled to the buffer to select a subset of data values from the plurality of data values according to a select value. The equalizing circuit is coupled to receive the subset of data values from the select circuit and is adapted to adjust, according to the subset of data values, a signal level that corresponds to a data signal transmitted on the signaling path during a second time interval.

30 Claims, 22 Drawing Sheets

U.S. PATENT DOCUMENTS

2002/0149402 A1* 10/2002 Martin et al. ............... 327/108
2002/0176481 A1* 11/2002 Shiina et al. ................ 375/130

OTHER PUBLICATIONS

Response to Non-Final Office Action dated Apr. 6, 2009, U.S. Appl. No. 10/195,140, filed Jul. 12, 2002.
Final Office Action dated Jul. 8, 2009, United States Patent & Trademark Office, U.S. Appl. No. 10/195,140, filed Jul. 12, 2002.
Response to Final Office Action dated Sep. 2, 2009, U.S. Appl. No. 10/195,140, filed Jul. 12, 2002.
Response to Non-Final Office Action dated Apr. 27, 2010, U.S. Appl. No. 12/269,513, filed Nov. 12, 2008.
Supplemental Amendment dated May 3, 2010, U.S. Appl. No. 12/269,513, filed Nov. 12, 2008.
Non-Final Office Action dated May 26, 2010, U.S. Appl. No. 12/269,532, filed Nov. 12, 2008.
Final Office Action dated Jul. 15, 2010, United States Patent & Trademark Office, U.S. Appl. No. 12/269,513, filed Nov. 12, 2008.
Response to Office Action filed Aug. 25, 2010 in U.S. Appl. No. 12/269,532 filed on Nov. 12, 2008.
Response to Office Action filed Sep. 7, 2010, U.S. Appl. No. 12/269,513 filed Nov. 12, 2008.
Notice of Allowance and fee(s) due dated Sep. 20, 2010, U.S. Appl. No. 12/269,532 filed Nov. 12, 2008.

* cited by examiner

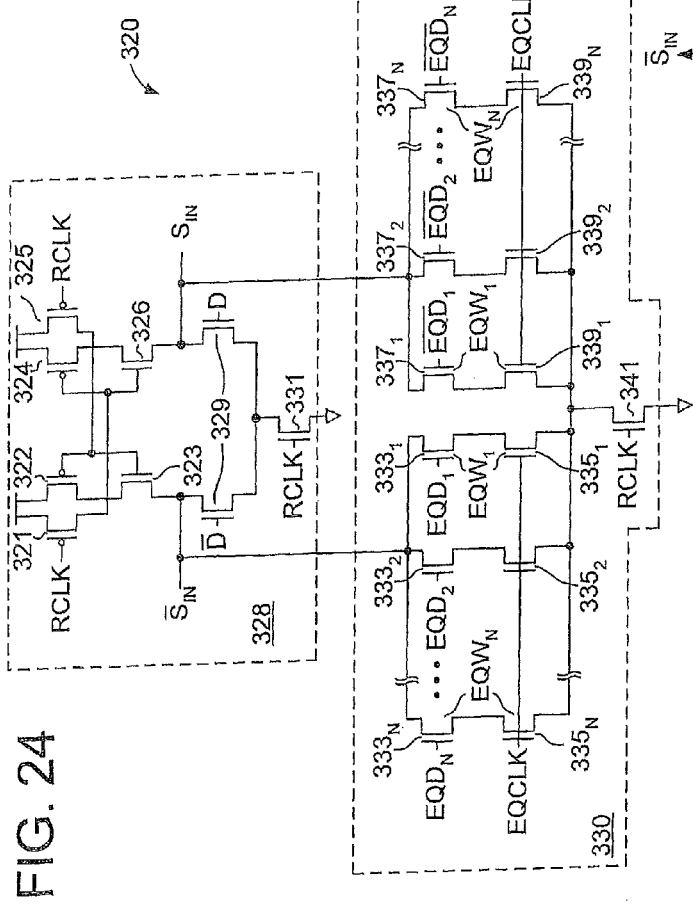
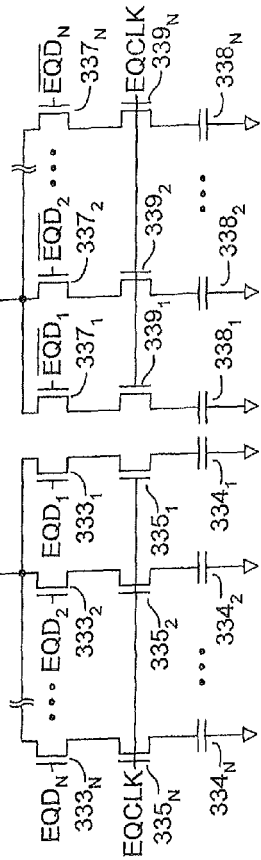
FIG. 24
FIG. 25

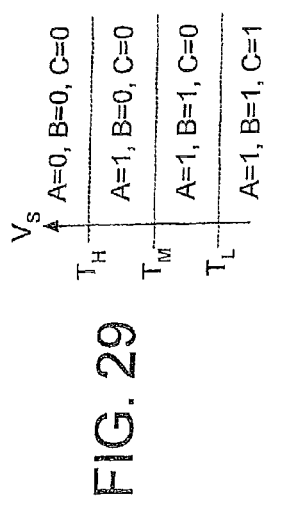
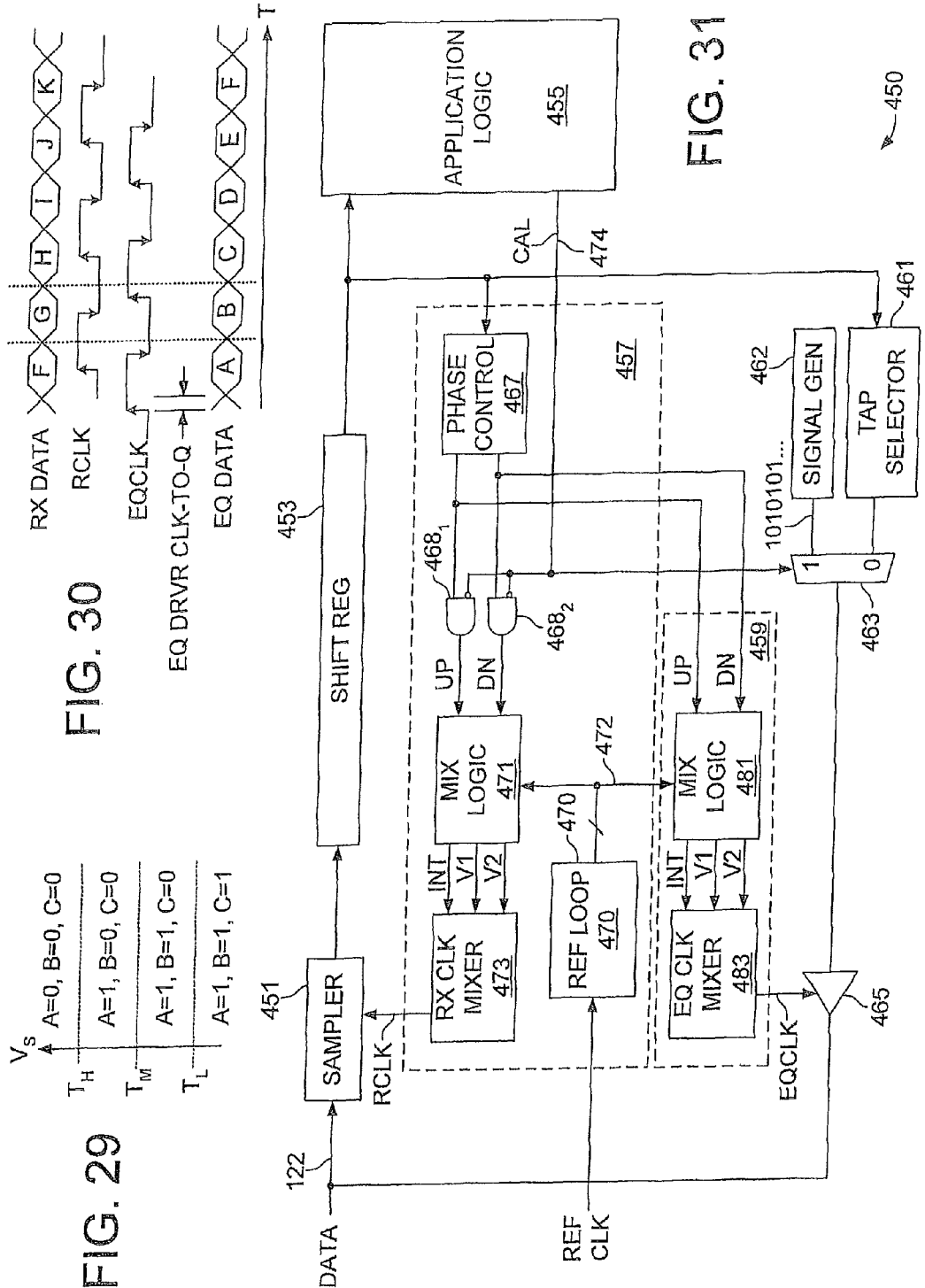

SELECTABLE-TAP EQUALIZER

CLAIM OF PRIORITY

This application is a continuation of U.S. patent application Ser. No. 12/269,488 filed on Nov. 12, 2008, (still pending); which is a divisional of U.S. patent application Ser. No. 11/871,666 filed on Oct. 12, 2007, now U.S. Pat. No. 7,508,871; which is a continuation of U.S. patent application Ser. No. 10/195,129 filed on Jul. 12, 2002, now U.S. Pat. No. 7,292,629.

FIELD OF THE INVENTION

The present invention relates generally to high speed signaling within and between integrated circuit devices, and more particularly to reducing latent signal distortions in high speed signaling systems.

BACKGROUND

Equalizing driver circuits are often used in high speed signaling systems to mitigate the effects of inter-symbol interference and crosstalk. Referring to signaling system 100 of FIG. 1, for example, data values queued in buffer 104 are output to signal path 102 by output driver 101 simultaneously with transmission of an equalizing signal by equalizing driver 109. In the example shown, the equalizing driver 109 includes a shift register 113 and a bank of output drivers 111 to generate an equalizing signal based on the two most recently transmitted data values and the data value to be transmitted after the present, reference value. Thus, the equalizing driver 109 constitutes a three-tap (i.e., three data source) equalizer for reducing inter-symbol interference that results from dispersion of signals transmitted near in time to the reference value (i.e., dispersion-type ISI).

While the equalizing driver 109 is effective for reducing relatively low-latency distortions such as dispersion-type ISI, other types of systematic distortions, such as signal reflections (also referred to as reflection-type ISI), tend to have a much higher latency (i.e., occur much later in time relative to transmission of the reference value) and therefore would require a substantially larger number of taps and a correspondingly larger shift register to counteract. For example, in the system of FIG. 1, a first reflection, $A_T$, occurs when a reference signal encounters an impedance discontinuity at a transmit-side interface 105 between a transmit-side portion (102A) and a backplane portion (102B) of the signal path 102 (e.g., a connector interface to a backplane). Because the reflection bounces between the interface 105 and the output of the transmit circuit, the reflection will arrive at the input of a receiver 103 with a latency (i.e., delay relative to arrival of the unreflected reference signal) equal to approximately twice the reflection flight time between the transmit-side interface 105 and the transmit circuit output. Impedance discontinuities at the input to receiver 103 and at a receive-side interface 107 between a receive-side portion (102C) and the backplane portion (102B) of the signal path 102 similarly produce reflections, $A_R$, $C_T$, $C_R$ and D that arrive at the receiver 103 at respective, latent times according to the additional distance traveled by the reflections. FIG. 2 is a waveform diagram of reflections $A_T$, $A_R$, B, $C_T$, $C_R$ and D illustrating their respective latencies relative to reference signal arrival time, T ($A2_{TR}$ corresponds to additional reflections produced by the interface 105). Because such reflections may occur at latencies on the order of tens or even hundreds of signal transmission intervals, the shift register 113 would need to be substantially deeper in order to store the tap values needed to mitigate the resulting distortions. Moreover, the precise time at which reflections arrive at the receiver 103 are dependent upon system configuration, meaning that a generally applicable equalizer, whether implemented on the transmit or receive side of the signaling system 100, would need a relatively large number of equalizing taps to be able to compensate for a reflection occurring at any time between the signal transmit time and a worst case latency. Unfortunately, each additional equalizing tap increases the parasitic capacitance of the transmit or receive circuit, degrading the frequency response of the circuit and potentially increasing the impedance discontinuity (and therefore the magnitude of reflected signal) at the circuit input/output.

BRIEF DESCRIPTION OF THE DRAWINGS

The present invention is illustrated by way of example, and not by way of limitation, in the figures of the accompanying drawings and in which like reference numerals refer to similar elements and in which:

FIG. 24 illustrates another type of equalizing circuit that may be used in embodiments of the invention;

FIG. 25 illustrates an embodiment of a level shifting circuit that used within the equalizing circuit of FIG. 24;

FIG. 29 illustrates an exemplary encoding of bits according to the level of a sampled, multilevel input signal;

FIG. 30 illustrates an exemplary timing relationship between clock, data and equalization signals in an equalizing receiver;

FIG. 31 illustrates an embodiment of an equalizing receiver that generates receive and equalization clock signals having the phase relationship shown in FIG. 30;

DETAILED DESCRIPTION

Figures 1, 2:
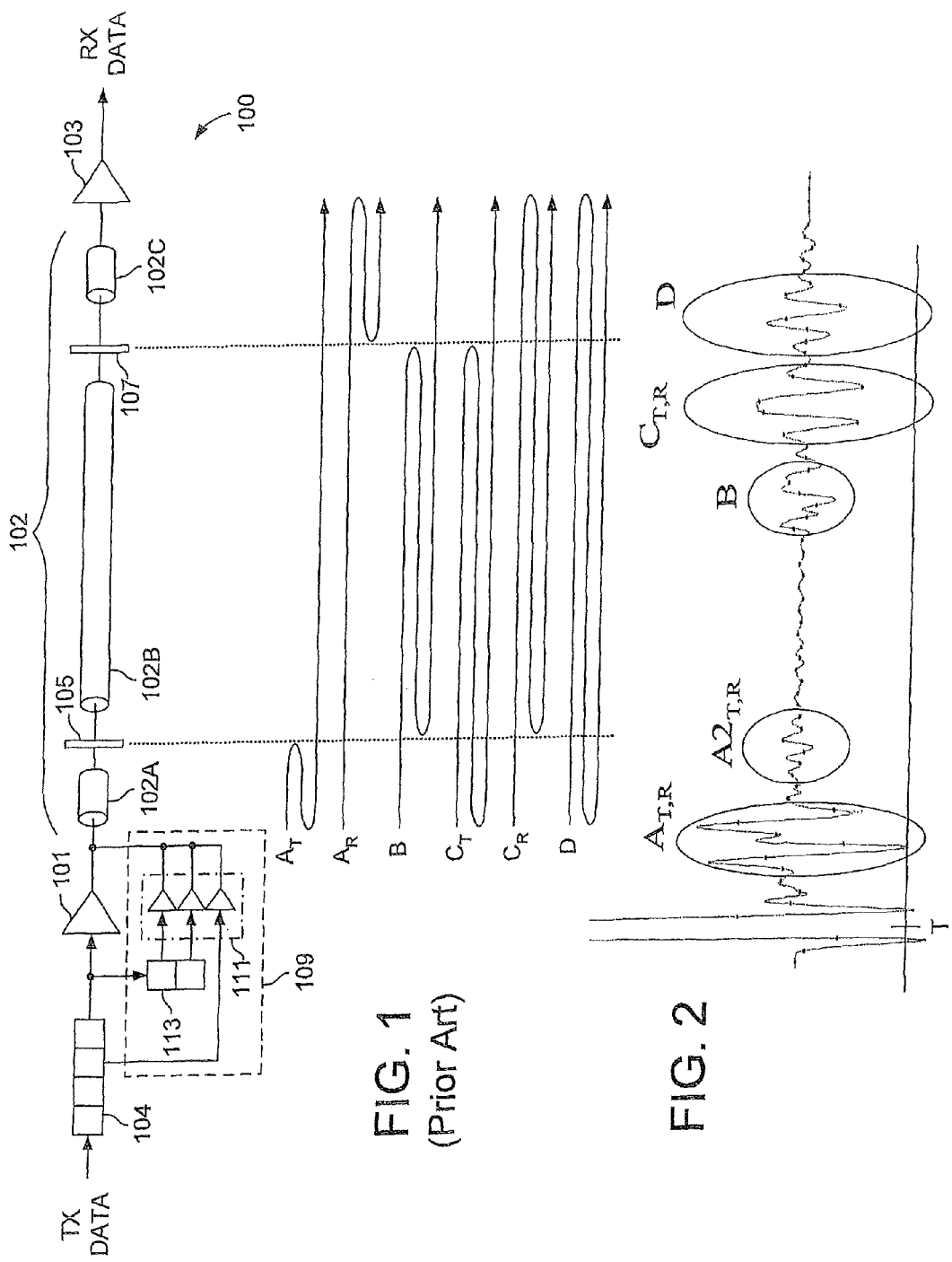
FIG. 1 illustrates a prior-art signaling system.
FIG. 2 is a waveform diagram of reflected signals produced by the prior-art signaling system of FIG. 1.

In the following description, specific nomenclature is set forth to provide a thorough understanding of the present invention. However, it will be apparent to one skilled in the art that these specific details may not be required to practice the present invention. In some instances, the interconnection between circuit elements or circuit blocks may be shown as multi-conductor or single conductor signal lines. Each of the multi-conductor signal lines may alternatively be single signal conductor lines, and each of the single conductor signal lines may alternatively be multi-conductor signal lines. A signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. Active low signals may be changed to active high signals and vice-versa as is generally known in the art.

Signaling systems and circuits for equalizing low- and high-latency signal distortions are disclosed herein in various embodiments (herein, equalizing refers to counteracting, canceling or otherwise reducing signal distortion). In one embodiment, low-latency distortions (e.g., dispersion-type ISI, cross-talk, etc.) are reduced by a transmit-side equalization circuit, and high-latency distortions (e.g., signal reflections) are reduced by a receive-side equalization circuit; the latency of receive-side equalization taps being offset relative to the reception time of a reference signal by the number of transmit-side equalization taps.

Because data values received within an equalizing receiver are stored for parallel transfer to application logic, stored data is available to supply receive-side equalizer taps; no additional shift register or other storage circuit is necessary to store equalizer data. In one embodiment, a select circuit is provided to selectively route a relatively small subset of the stored data values to equalizing taps within the equalizing receiver. By this arrangement, reflected signals arriving at various, latent times may be counteracted by routing of selected stored data values to the receive-side equalization taps. Because the number of equalizing taps within the equalizing receiver is small relative to the range of time for which distortion events are mitigated, the parasitic capacitance of the equalizing receiver is small relative to the parasitic capacitance that would result from providing a dedicated tap for each stored data value.

Signaling System with Selectable-Tap Equalizer

Figure 3:
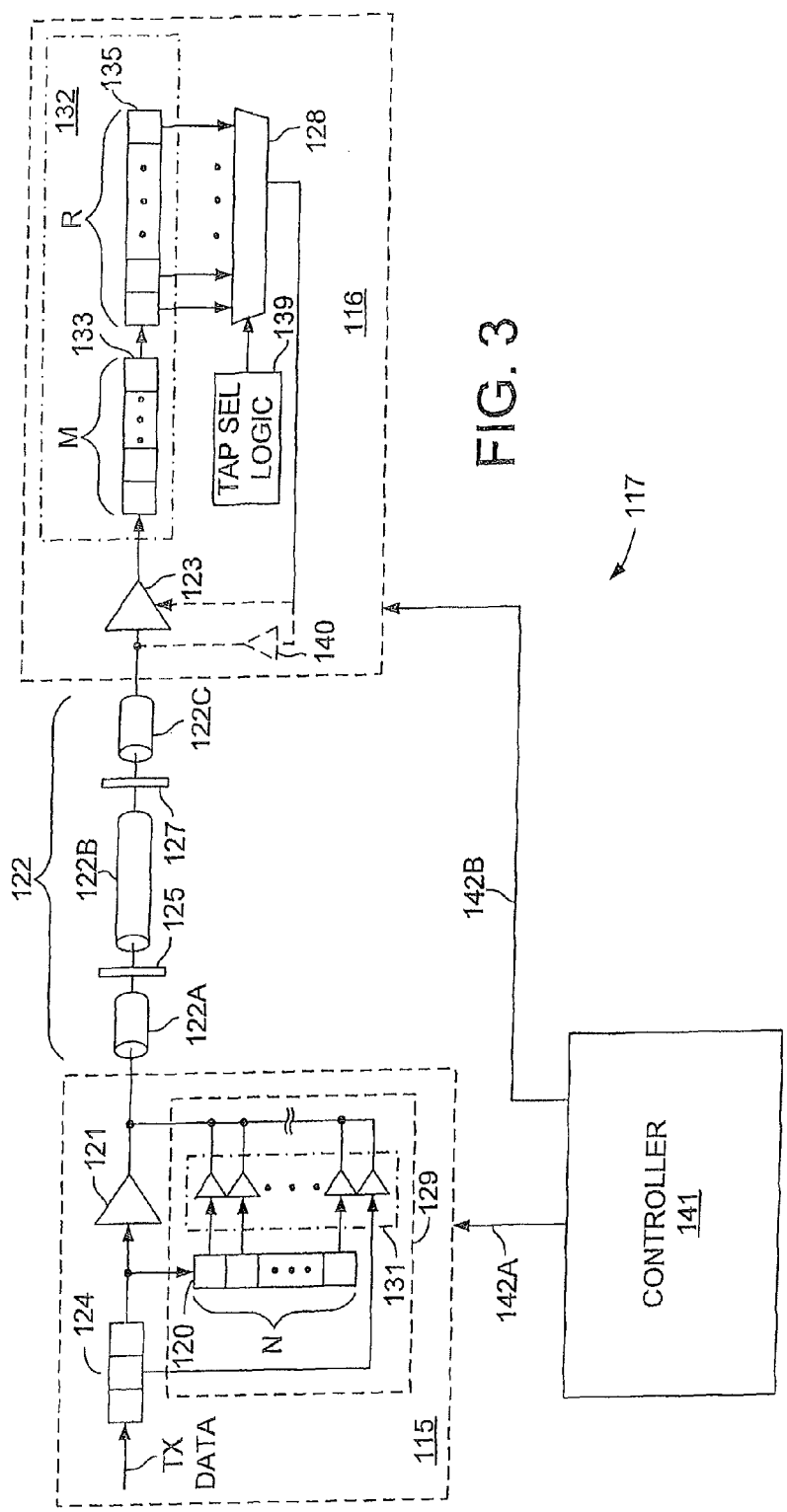
FIG. 3 illustrates a signaling system according an embodiment of the invention.

FIG. 3 illustrates a signaling system 117 according to an embodiment of the invention. The system 117 includes an equalizing transmitter 115 and equalizing receiver 116 coupled to one another via a high-speed signal path 122, and a controller 141 coupled to the transmitter 115 and the receiver 116 via relatively low-speed signal paths 142A and 142B, respectively. In one embodiment, the signal path 122 is formed by component signal paths 122A, 122B and 122C (e.g., transmission lines that introduce respective, nonzero propagation delays and exhibit respective impedance characteristics), each disposed on respective circuit boards that are coupled to one another via circuit board interfaces 125 and 127 (e.g., connectors). In a specific implementation, signal path 122B is formed on a backplane and signal paths 122A and 122C are formed on respective daughterboards (e.g., line cards) that are removably coupled to the backplane via connectors 125 and 127. The transmitter 115 and receiver 116 are implemented in respective integrated circuit (IC) devices that are mounted on the daughterboards. The controller, which may be a general or special purpose processor, state machine or other logic circuit, is implemented within a third integrated circuit device mounted to a yet another circuit board. In the embodiment of FIG. 3, signal paths 142A and 142B are used to convey configuration information from the controller 141 to the transmitter 115 and receiver 116, respectively, and may be disposed on the same circuit board (or circuit boards) as signal path 122 or implemented by an alternative structure such as a cable. The controller may alternatively be coupled to the transmitter 115 and receiver 116 by a shared signal path such as a multi-drop bus. The operation of the controller 141 is discussed in greater detail below. In alternative embodiments, the IC devices containing the transmitter 115, receiver 116 and controller 141 may be mounted to a common structure with the signal paths 122, 142A and 142B coupled directly to the IC devices (e.g., all three ICs mounted to a circuit board and coupled to one another via circuit board traces, or all three ICs packaged within a single multi-chip module with signal paths 122 and 142 formed between the ICs by bond wires or other conducting structures). Also, the transmitter 115, receiver 116 and controller 141, or any subset thereof, may be included within the same IC device (e.g., system on chip) and the signal paths 122 and/or 142 implemented by a metal layer or other conducting structure within the IC device.

Figure 4:
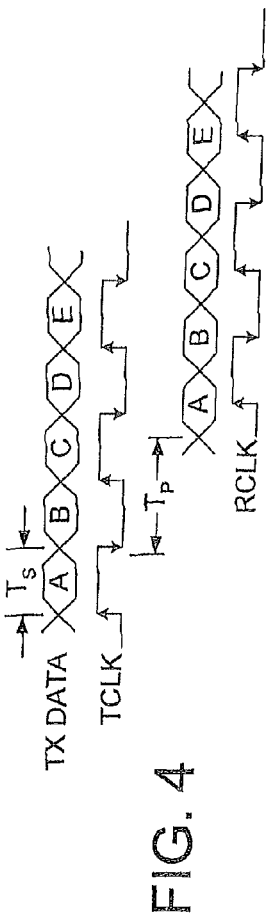
FIG. 4 illustrates an exemplary relationship between clock and data signals in the signaling system of FIG. 3.

The transmitter 115 transmits data on the signal path 122 during successive time intervals, referred to herein as symbol times. In one embodiment, illustrated by the timing diagram of FIG. 4, each symbol time, $T_S$, corresponds to a half cycle of a transmit clock signal, TCLK, such that two data values (e.g., values A and B) are transmitted on signal path 122 per transmit clock cycle. The transmitted data signal arrives at the input of receiver 116 after propagation time, $T_P$, and is sampled by the receiver 116 in response to edges of a receive clock signal, RCLK. Still referring to FIG. 4, the receive clock signal has a quadrature phase relation to data valid windows (i.e., data eyes) in the incoming data signal such that each sample is captured at the midpoint of a data eye. In alternative embodiments, the sampling instant may be skewed relative to data eye midpoints as necessary to satisfy signal setup and hold time requirements in the receiver 116. Also, more or fewer symbols may be transmitted per cycle of the transmit clock signal.

The equalizing transmitter 115 includes a transmit shift register 124, output driver 121 and equalizer circuit 129; the equalizer circuit 129 itself including a shift register 120 and a bank of output drivers 131. At the start of each symbol time, the data value at the head of the transmit shift register 124, referred to herein as the primary data value, is driven onto the signal path 122 by the output driver 121, and the equalizer circuit 129 simultaneously drives an equalizing signal onto the signal path 122. This type of equalization is referred to herein as transmit preemphasis. In one embodiment, the signal driven onto the signal path 122 by the output driver 121 (referred to herein as the primary signal) is a multi-level signal having one of four possible states (e.g., defined by four distinct signal ranges) and therefore constitutes a symbol representative of two binary bits of information. In alternative embodiments, the primary signal may have more or fewer possible states and therefore represent more or fewer than two binary bits. Also, the primary signal may be single-ended or differential (an additional signal line is provided to carry the complement signal in the differential case), and may be a voltage or current mode signal.

Each of the output drivers 131 within the equalizer circuit 129 form either a pre-tap driver or post-tap driver according to whether the source data value has already been transmitted (post-tap data) or is yet to be transmitted (pre-tap data). In the specific embodiment of FIG. 3, the equalizer includes N post-tap drivers sourced by data values within the shift register 120 and one pre-tap driver sourced by a data value within the transmit shift register 124. Accordingly, the resultant equalizing signal driven onto the data path 122 will have a signal level according to data values having symbol latencies of −1, 1, 2, . . . , N, where the symbol latency of a given data value refers to the number of symbol times by which transmission of the data value precedes the transmission of the primary value. Different numbers of post-tap and pre-tap drivers may be provided in alternative embodiments, thereby allowing for equalization based on values having different symbol latencies.

Still referring to FIG. 3, the receiver 116 includes a sampling circuit 123, buffer 132, tap select circuit 128 and tap select logic 139. Data signals are sampled by the sampling circuit 123, then stored in the buffer 132 for eventual use by application logic (not shown). Because the buffered data is stored for at least a predetermined time, and represents historical data up to a predetermined number of symbol latencies, the buffered data forms an ideal source of post-tap data values. That is, in contrast to transmit-side buffering of post-tap data values (which requires dedicated storage such as shift register 120), buffering of received data in receiver 116 incurs no additional storage overhead because the received data values are buffered in any event to facilitate transfer to receive-side application logic. Additionally, the tap select circuit 128 enables a subset of data values within the buffered data to be selected to source equalizer taps in a receive-side equalizer circuit. Because the subset of data values may be selected according to the precise symbol latencies of reflections and other high-latency distortions, a relatively small number of data values may be selected to form receive-side equalization taps having latencies that match the latencies of the distortions. By this arrangement, high latency distortions may be reduced by receive-side equalization without dramatically increasing the parasitic capacitance of the receiver (i.e., as would result from a large number of receive-side equalization taps).

In one embodiment, the tap select logic is a configuration circuit that outputs a tap select signal according to a configuration value. As discussed below, the configuration value may be automatically generated by system 117 (e.g., at system startup) or may be empirically determined and stored within the configuration circuit or elsewhere within system 117.

Still referring to FIG. 3, numerous alternative types of equalization circuits may be used within the receiver 116. For example, in one embodiment, the receiver 116 includes an output driver 140 (illustrated in dashed outline in FIG. 3 to indicate its optional nature) to drive an equalizing signal onto the signal path 122 (and therefore to the input of the sampling circuit 123) coincidentally with the symbol time of an incoming signal. In another embodiment, the sampling circuit 123 includes a preamplifier having an equalizing subcircuit. In yet another embodiment, an equalizing subcircuit is coupled to the sampling circuit itself. Each of these embodiments is described in further detail below.

Still referring to FIG. 3, the distribution of low- and high-latency equalization functions between the equalizing transmitter 115 and equalizing receiver 116 is achieved through use of a dead range within the receive-side buffer 132. That is, the range of stored data values that may be selected to source receive-side equalization taps (i.e., R) is offset from the sampling instant by a number of symbol times, M. In one embodiment, M is equal to N, the number of post-tap drivers, such that transmit preemphasis is used to reduce distortions resulting from symbol transmissions up to N symbol times prior to transmission of the primary signal, and receive-side equalization is used to reduce distortions resulting from symbol transmissions more than N symbol times prior to transmission of the primary signal. For example, if there are four post-tap drivers in the transmitter 116 (i.e., M=N=4), then the lowest latency value within the range, R, of stored data values is M+1=5 symbol times, and the receiver 116 is said to have a dead range of four symbol times. In the embodiment of FIG. 3, buffer 132 is formed by a shift register having a dead range component 133 and a selectable-range component 135, the tap selector 128 being coupled to the selectable-range component 135 to select the subset of tap data sources therefrom. In alternative embodiments, the dead range component of the buffer 132 may include fewer than M storage elements or even zero storage elements, depending on the time required to receive data and transfer data into the buffer 132. Also, the tap selector 128 may be coupled to one or more storage elements within the dead range component 133 to enable the size of the dead range to be programmed according to the configuration of the transmit circuit 115. Finally, as discussed below, the buffer 132 may include one or more parallel registers in addition to (or instead of) the shift register formed by components 133 and 135.

Figure 5:
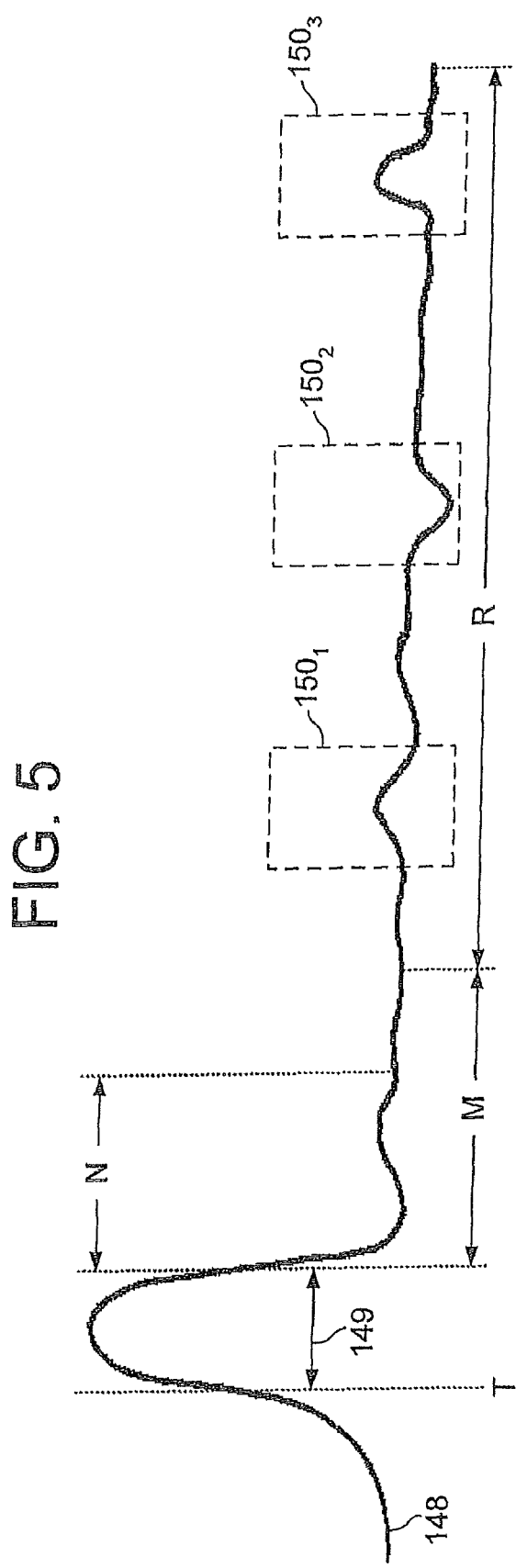
FIG. 5 illustrates the manner in which pre-emphasis and selectable-tap equalization are employed to reduce low- and high-latency distortions in the signaling system of FIG. 3.

FIG. 5 illustrates the manner in which pre-emphasis at the transmitter 115 and selectable-tap equalization within the receiver 116 are employed to reduce low- and high-latency distortions in the signaling system of FIG. 3. Waveform 148 depicts the state of the signal path 122 during and after non-equalized transmission of a primary signal to illustrate the low- and high-latency distortions that may result. The primary signal is transmitted during a transmit interval 149 (i.e., a symbol time) that starts at time T, and the corresponding primary value is used to generate a transmit-side equalization signal (i.e., preemphasis signal) over a window of N symbol times following the transmit interval 149. The transmit-side equalization signal is used to reduce low-latency distortions that may result from any number of sources including, without limitation, dispersion-type ISI, inductive and capacitive coupling (which may be compensated, for example, by sourcing a pre-emphasis output driver within bank 131 with a value being transmitted on a neighboring signal path), and low-latency reflections (e.g., reflections that do not travel significantly further than the unreflected primary signal and therefore arrive at the receiver shortly after the primary signal). The primary signal is sampled by the receiver 116 during a reception interval (i.e., data valid window) that corresponds to the transmit interval 149, the reception interval being shifted relative to the transmit interval according to the signal flight time between the transmitter 115 and receiver 116. The selectable-tap equalizer within the receiver 116 has a dead range of M symbol times and a selectable range of R symbol times. Accordingly, the sampled primary value (i.e., the primary received during the reception interval) is selectable to source an equalizer tap within the receiver 116 when the symbol latency of the sampled primary value is greater than M symbol times and less or equal to R symbol times. Thus, during given reception interval, previously received values having symbol latencies ranging from M+1 to R may be selected by the tap selector 128 of FIG. 3 and used to reduce high-latency distortions. Intervals $150_1$, $150_2$, and $150_3$ within interval 153 illustrate equalization windows achieved by tap selections within the tap selector 128. For example, interval $150_1$ corresponds to one or more tap selections used to equalize a distortion occurring shortly after the dead range, while interval $150_3$ corresponds to one or more tap selections used to reduce a distortion caused by a signal transmission dozens or even hundreds of symbol times prior to the current reception interval. In the transmit circuit 115 of FIG. 3 and other equalizing transmitters disclosed herein, the polarity of signal contributions which form the transmit preemphasis signal (including any cross-talk cancellation component thereof) may be fixed or programmable and may be established (or controlled) within the data shift registers (i.e., 124 and 120) or by the output drivers themselves (e.g., output drivers within bank 131). Similarly, in the receive circuit 116 of FIG. 3 and other equalizing receivers disclosed herein, the polarity of signal contributions which form the receiver equalization signal (including any cross-talk cancellation component thereof) may be fixed or programmable and may be established (or controlled) within a data storage circuit (i.e., buffer 132) or within a receiver equalization circuit.

The ability to control tap data latencies with the tap select logic 139 and tap selector 128 of FIG. 3 enables the equalization windows 150 to be shifted within the selectable range, R, as necessary to reduce high-latency distortions, thereby permitting generalized application of system 117 in environments having a variety of different distortion characteristics. In the signaling system 117 of FIG. 3, the controller 141 is used to configure one or more of the values of N, M and R (i.e., the number of transmit-side post-tap equalizers, the receive-side dead range and the receive-side selectable range) according to system needs. In one embodiment, the controller includes a non-volatile memory to store empirically or analytically determined values of N, M and R. Alternatively, the signaling system 117 may include a separate storage (e.g., flash memory, or other non-volatile media) to store values of N, M and R (or values that may be used to determine N, M and R), the controller 141 being coupled to access such separate storage via signal path 142 or another path. In either case, when the signaling system 117 is initially powered on, the controller 141 communicates the post-tap equalizer count, N, to the transmitter 115 and the dead range and selectable range values, M and R, to the receiver 116. Alternatively, the values of N, M and R may be determined at production time (e.g., through system testing) or design time, and pre-programmed into configuration circuitry within the transmitter 115 and/or receiver 116, or fixed by design of the transmitter 115 and/or receiver 116. In such embodiments, the controller 141 and signal path 142 may be omitted altogether.

As discussed below, embodiments of the invention may additionally include circuitry to automatically determine distortion latencies and to select correspondingly latent data tap sources from the buffer 132, thus providing a system-independent solution for reducing systematic distortion events of virtually any latency. The controller 141 may be used to coordinate operation of the transmitter 115 and receiver 116 during such automatic distortion latency determination, and also to determine appropriate settings of N, M and R based on such distortion latencies.

Far-End and Near-End Cross-Talk Cancellation

As discussed above in reference to FIG. 3, the transmit-side equalizer circuit 129 may be used to reduce signal distortion resulting from inductive and capacitive coupling of signals transmitted on neighboring signal paths; a type of equalization referred to as far-end cross-talk cancellation. In one embodiment, the output driver bank 131 includes additional output drivers to generate equalization signals based on values being transmitted on signal paths that are adjacent or otherwise proximal to the signal path 122. By appropriate polarity control (performed, for example, within the output drivers or data shift register), an equalizing signal having a polarity opposite that of an interfering neighboring signal is transmitted on the signal path 122, thereby reducing the signal interference.

The number of equalizer taps needed for cross-talk cancellation within a given signaling system is dependent on the physical layout of signal paths relative to one another. For example, in a system in which signal paths 122 are arranged relative to one another such that cross-talk interference is negligible (e.g., paths 122 are spaced apart, arranged in an orthogonal disposition (e.g., twisted pair), etc.), no equalizer taps may be needed for cross-talk cancellation. By contrast, in a system in which signal paths form parallel adjacent paths (e.g., parallel traces on a printed circuit board or parallel conductors within a multi-conductor cable), one or more equalizer taps may be needed for each adjacent pair of signal paths. In one embodiment of the invention, equalizer taps are selectively coupled to either pre-tap, post-tap or cross-talk cancellation data sources (i.e., primary value being transmitted on neighboring path). By this arrangement, equalizer taps may be selectively configured, according to system requirements, to provide either temporal equalization (i.e., pre-tap and/or post-tap equalization) or cross-talk cancellation.

Figure 6:
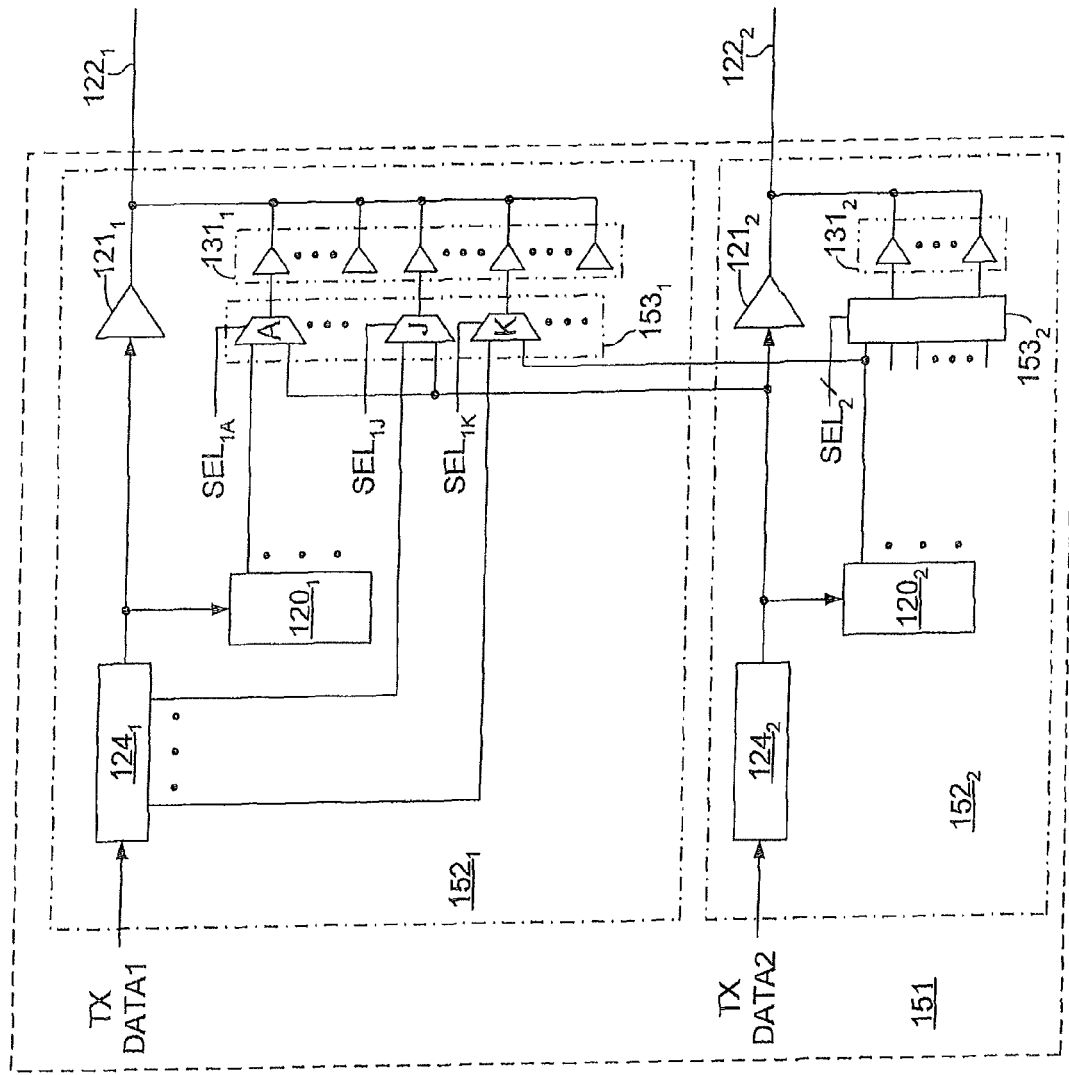
FIG. 6 illustrates a transmit device having circuitry for selecting between temporal equalization and cross-talk cancellation data sources.

FIG. 6 illustrates a transmit device 151 having circuitry for selecting between temporal equalization and cross-talk cancellation data sources. The transmit device 151 includes transmitters $152_1$ and $152_2$, each for transmitting data signals on a respective signal path $122_1$ and $122_2$. Respective sources of transmit data values (TX DATA1 and TX DATA2) are provided from other logic (not shown) within transmit device 151. Although only two transmitters 152 are shown, additional transmitters may be provided in accordance with the number of signal paths 122 and/or the number of sources of transmit data values.

Each of the transmitters 152 includes a transmit shift register ($124_1$, $124_2$), output driver ($121_1$, $121_2$), post-tap data shift register ($120_1$, $120_2$) and output driver bank ($131_1$, $131_2$) that operate generally as described in reference to FIG. 3. Each transmitter 152 additionally includes a tap data source selector ($153_1$, $153_2$) having one or more multiplexers for selectively coupling either a local data value (e.g., a pre-tap or post-tap data value from corresponding transmit shift register 124 or post-tap data shift register 120) or a remote data value (e.g., a primary value supplied from the head of a transmit shift register 124 of another transmitter, or a post-tap data value supplied from the post-tap data shift register of another transmitter) to be the equalization tap data source. For example, multiplexer A within tap data source selector $153_1$ has a first input coupled to a storage element within post-tap data shift register $120_1$ and a second input coupled to the output of transmit shift register $124_2$, and selects, according to a select signal $SEL_{1A}$, either a post-tap data value within shift register $120_1$, or the remote primary value output by shift register $124_2$ to be the tap data source for an output driver within output driver bank $131_1$. Multiplexer J within tap data source selector $153_1$ has a first input coupled to a storage element within the transmit shift register $124_1$ and a second input coupled to the output of the transmit shift register $124_2$, and selects, according to a select signal $SEL_{1J}$, either a pre-tap data value within the transmit shift register $124_1$, or the remote primary value to be the data tap source for an output driver within output driver bank $131_1$.

To enable cancellation of crosstalk interference that lasts for more than a single symbol time, additional multiplexers may be provided within the tap data source selectors 153 to select between local data values (pre- or post-tap) and remote post-tap data values. For example, multiplexer K within tap data source selector $153_1$ has a first input coupled to receive a pre-tap data value from transmit shift register $124_1$ and a second input coupled to receive a remote post-tap data value from post-tap register $120_2$, and selects between the two inputs according to select signal $SEL_{1K}$. Tap data source selector $153_2$ similarly includes one or more multiplexers to select between pre-tap, post-tap and/or cross-talk cancellation data sources for output driver bank $131_2$. By this arrangement, output drivers within banks 131 may alternatively be used to generate temporal equalization signals or cross-talk cancellation signals according to system needs.

Although the multiplexers within tap data source selectors $153_1$ and $153_2$ are depicted as two-input multiplexers, multiplexers having more than two inputs may alternatively be used. For example, multiplexer A of data source selector $153_1$ may include one or more inputs to receive pre-tap data values from register $124_1$, one or more inputs to receive post-tap data values from post-tap register $120_1$, and/or one or more inputs to receive cross-talk cancellation data values (i.e., remote primary, pre-tap and/or post-tap values from any number of other transmitters 152). In general, each output driver within an output driver bank 131 may be sourced by a multiplexer that selects between any number of pre-tap, post-tap and/or cross-talk cancellation data sources. Also, not all output drivers within output driver banks 131 need be fed by multiplexers, but rather may be coupled to dedicated tap data sources.

In one embodiment, the select signals, $SEL_1$ (including signals $SEL_{1A}$, $SEL_{1J}$, $SEL_{1K}$, etc.) and $SEL_2$, are generated by a configuration circuit (not shown) within transmit device 151 or elsewhere in a signaling system that includes transmit device 151. The configuration circuit may be pre-programmed or may be programmed at system start-up, for example, by a controller similar to controller 141 of FIG. 3.

As described in reference FIG. 6, selective-tap transmit-side preemphasis may be used to cancel or reduce interference between signals transmitted in the same direction on neighboring or otherwise proximal signal lines (i.e., far-end cross-talk). Selective-tap receive-side equalization may similarly be used to reduce interference between outgoing and incoming transmissions on proximal signal lines; interference referred to herein as near-end cross-talk.

Figure 7:
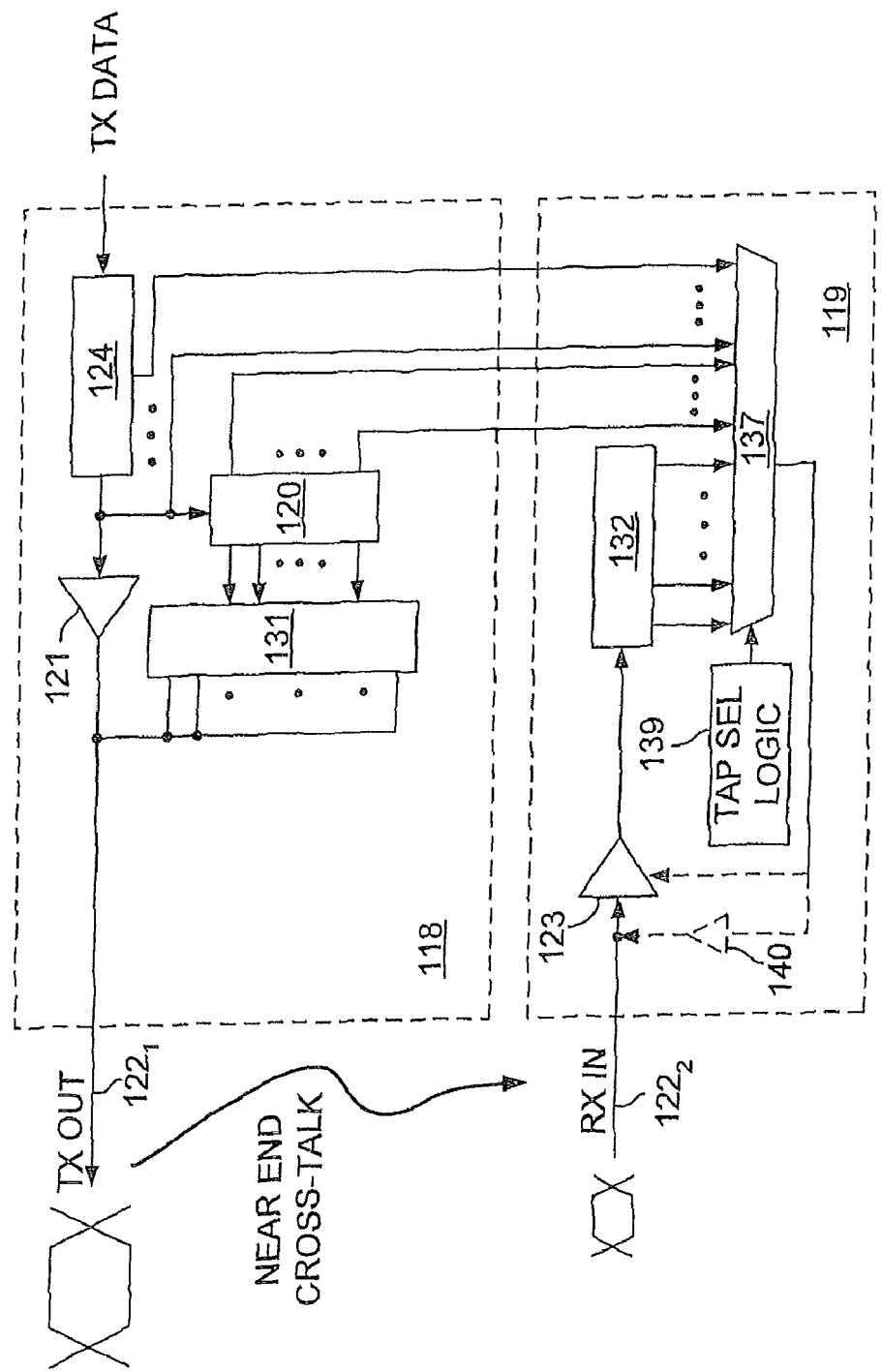
FIG. 7 illustrates transmit and receive devices configured to perform near-end cross-talk cancellation.

FIG. 7 illustrates transmit and receive devices (118 and 119, respectively) configured to perform near-end cross-talk cancellation. The transmit device 118 includes an output driver 121, transmit shift register 124, post-tap data shift register 120, and output driver bank 131, all of which operate generally as described above in reference to transmit device 115 of FIG. 3 to enable generation of an equalized transmit signal (TX OUT) on signal path $122_1$. Though not shown in FIG. 7, the transmit device 118 may additionally include select circuitry as described in reference to FIG. 6 to enable selection of various equalization data sources.

The receive device 119 includes a sampling circuit 123, buffer 132, tap select circuit 137, tap select logic 139 and equalization circuit (e.g., included within the sampling circuit 123 or implemented as an output driver 140) to receive an incoming signal (RX IN) on signal path $122_2$. As shown in FIG. 7, the incoming signal, RX IN, has a smaller amplitude than the transmit signal, TX OUT, (e.g., due to transmission losses) and therefore is particularly susceptible to near-end cross-talk interference. To counteract cross-talk interference from the TX OUT transmission, pre-tap, primary and post-tap data values used to generate the TX OUT signal (i.e., from transmit shift register 124 and post-tap data shift register 120) are supplied to the tap select circuit 137 within the receiver 119. By this arrangement, the tap select logic 139 may select, as tap values for the receiver equalization circuit, any combination of the received data values stored within buffer 132, and the pre-tap, post-tap and primary data values used to generate the TX OUT signal. As discussed above in reference to FIG. 3, tap select logic 139 outputs a control signal to the tap selector 137 to control tap data source selection according system configuration information. Thus, the pre-tap, post-tap and/or primary data values may be selected with the polarity necessary to achieve a subtractive effect on the corresponding cross-talk interference (the appropriate polarity being established or controlled within the buffer 132 or receiver equalizing circuit), thereby enabling reduction of near-end crosstalk interference. Although only a single tap select circuit 137 is shown in FIG. 7, any number of tap select circuits may be used.

Bi-Directional Signaling

Figure 8:
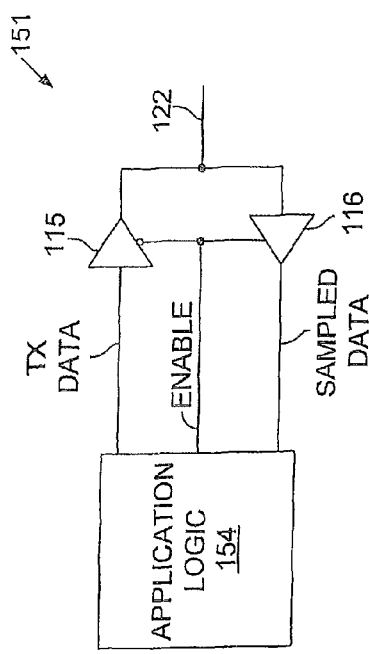
FIG. 8 illustrates a transceiver device that includes both an equalizing transmitter and an equalizing receiver.

Although a unidirectional signaling system is depicted in FIG. 3, embodiments of the invention are equally applicable in a bidirectional signaling system. FIG. 8, for example, illustrates a transceiver device 151 that may be coupled to either or both sides of signal path 122, and that includes both an equalizing transmitter 115 and an equalizing receiver 116 according to embodiments described herein (transmitters and receivers according to the cross-talk canceling embodiments described in reference to FIGS. 6 and 7 may also be used). The transceiver device 151 additionally includes an application logic circuit 154 to provide transmit data to the equalizing transmitter 115 and to receive sampled data from the equalizing receiver 116. The application logic circuit 154 also outputs an enable signal (ENABLE) to alternately enable the transmitter 115 to transmit data on the signal path 122 or the receiver 116 receive data from the signal path 122.

Figure 9:
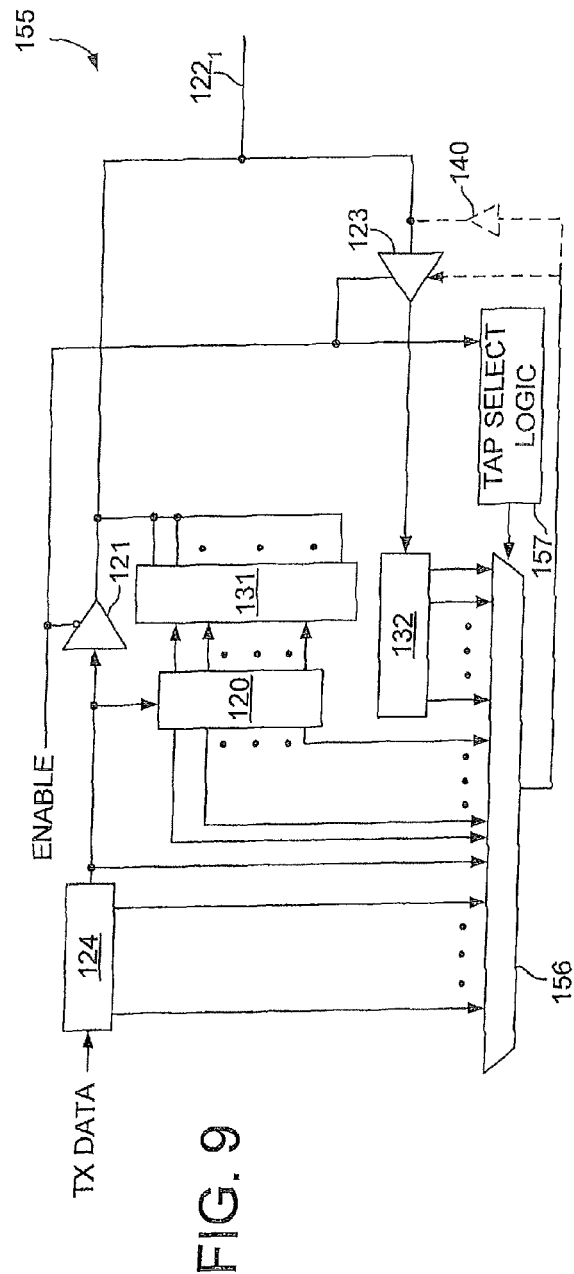
FIG. 9 illustrates an equalizing transceiver according to an embodiment in which both transmitted and received data values are stored and selectively used to source equalizer taps.

FIG. 9 illustrates an equalizing transceiver 155 according to an embodiment in which both transmitted and received data values are stored and selectively used to source equalizer taps. The transceiver 155 includes a transmit shift register 124, output driver 121, post-tap data shift register 120 and output driver bank 131 (which may include output drivers sourced by pre-tap data values, cross-talk cancellation values, or by tap data source selectors as described in reference to FIG. 6), all of which operate generally as described in reference to FIG. 3 to output, during a given transmit interval, a primary signal and corresponding equalization signal onto signal path 122. The transceiver also includes a sampling circuit 123, buffer circuit 132, tap selector 156 and tap select logic 157. The sampling circuit 123 samples data signals transmitted on signal path 122 (i.e., by a remote transmitter or transceiver) and stores the corresponding data values in buffer circuit 132. The tap selector 156 is coupled to the buffer circuit 132 as well as the transmit shift register (including the head of the transmit shift register which contains the primary data value) and the post-tap data shift register 120, and therefore enables any combination of received data values (i.e., from buffer 132) and pre-tap, primary and/or post-tap transmit data values to be selected as source data taps within an equalizing circuit (i.e., output driver 140 or an equalizing circuit within the sampling circuit 123). The tap select logic 157 outputs a control signal to the tap selector according system configuration information (i.e., information indicative of desired symbol latencies) and the historical state of the enable signal (ENABLE). Thus, depending on the desired symbol latencies of data taps, and the times at which the transceiver 155 is transitioned between sending and receiving data (i.e., turnaround times), the tap select logic 157 and tap selector 156 operate to select tap values from the transmit shift register 124, data tap shift register 120, and/or buffer circuit 132 in any combination. The selected tap values are then used to source equalizer taps within an equalizing output driver 140 or an equalizing circuit within sampling circuit 123.

Although the transceiver embodiments described in reference to FIGS. 8 and 9 include an enable line to alternately enable transmission or reception of signals, in alternative embodiments, the enable line may be omitted and transmission and reception of signals may occur simultaneously (i.e., simultaneous bi-directional signaling). In such a system, multilevel signaling may be used to enable an outgoing signal to be transmitted simultaneously (in effect, superimposed on) an incoming signal. Because the receive circuit has access to the transmitted data values, the receive circuit may subtract the locally transmitted signal from an incoming signal to recover only the desired portion (i.e., remotely transmitted portion) of the incoming signal. In such a system, the locally transmitted signal may produce dispersion- and reflection-type ISI that may be compensated by an equalizing receiver having, as an example, the configuration of FIG. 9, but omitting the enable line. In such an embodiment, the transmit shift register 124 and post-tap data register 120 may be selected by tap select circuit 156 to source tap data values for equalization of low- and/or high-latency distortions resulting from the local signal transmission (i.e., by output driver 121). Note that the post-tap data register may need to be extended (i.e., have an increased number of entries) to enable reduction of high-latency distortions resulting from the local signal transmission. The receive circuit tap selections, controlled by tap select logic 157, may be determined empirically or during run-time, for example, by using the methods and circuits described below for determining equalization tap latencies, weights and polarities.

Data Tap Selection

Figure 10:
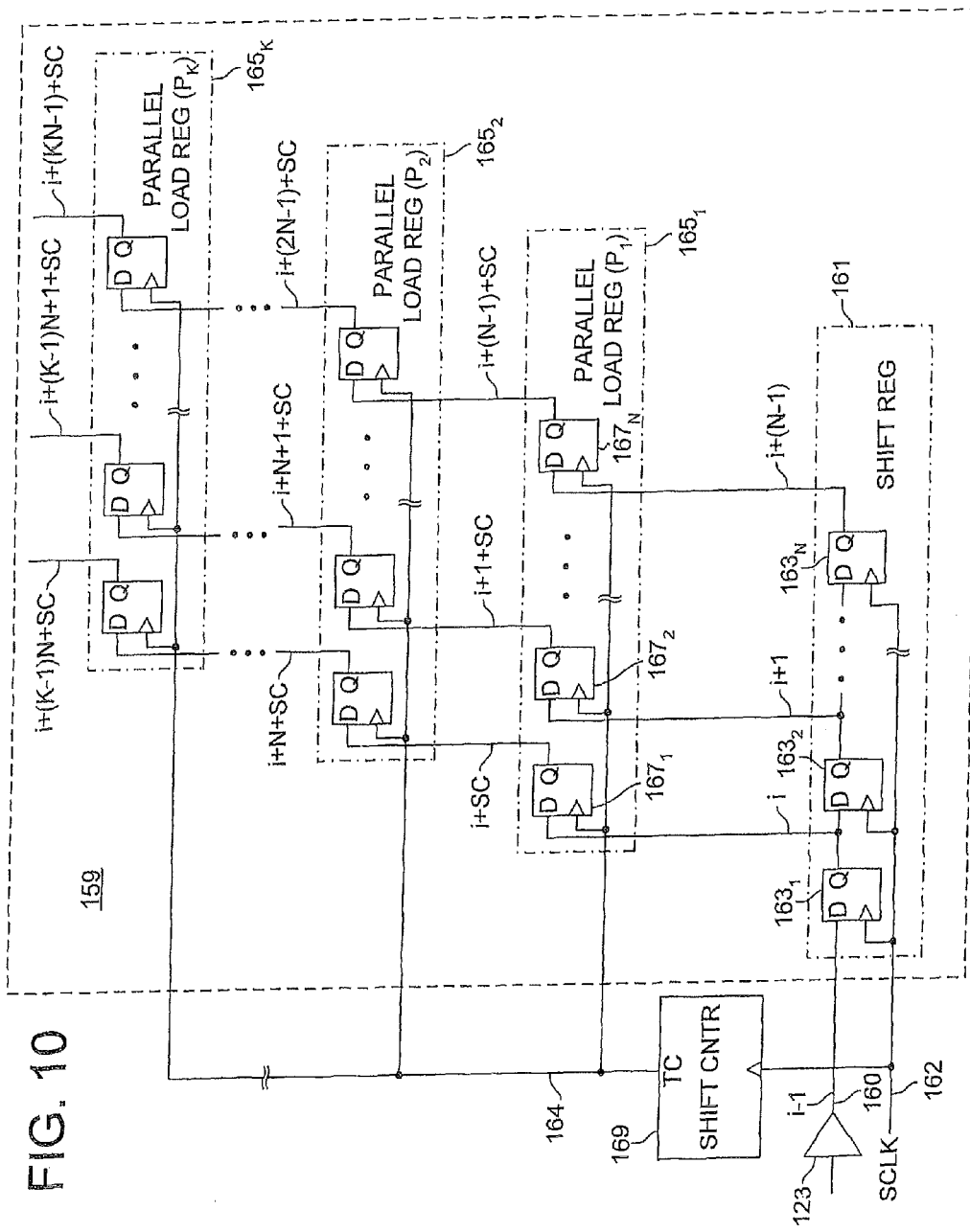
FIG. 10 illustrates an exemplary buffer that may be used within the receiver of FIG. 3.

FIG. 10 illustrates an exemplary buffer 159 that may be used within the receiver 116 of FIG. 3 and that includes both a serial shift register 161 as well as a number (K) of parallel-load registers $165_1$-$165_K$. At each edge of a receive clock signal, RCLK, a newly sampled data value 160 is loaded from sampling circuit 123 into the shift register 161. The shift register is formed by N storage elements (depicted as flip-flops $163_1$-$163_N$, though latches or other types of storage elements may be used) coupled in daisy chain fashion such that, as the newly sampled value 160 is loaded into the first storage element $163_1$ in the shift register 161, the contents of each storage element 163 except the last ($163_N$) is shifted to the next storage element in the chain in response to a receive clock signal (RCLK). Thus, designating the output of storage element $163_1$ to have symbol latency i, the symbol latency of the input value 160 is i−1, and the symbol latencies of the outputs of the remaining storage elements 163 in the shift register 161 are, from left to right, i+1, i+2, . . . , and i+(N−1), respectively.

A shift counter 169 (which may be included within or separate from buffer circuit 159) maintains a count of the number of data values shifted into the shift register 161, incrementing the shift count in response to each transition of RCLK. In one embodiment, the shift counter 169 asserts a load signal 164 (LD) upon reaching a count that corresponds to a full shift register, then rolls the shift count back to a starting value. The load signal 164 is routed to strobe inputs of storage elements within the parallel-load registers 165, enabling parallel load register $165_1$ to be loaded with the contents of the shift register, and enabling each of the parallel-load registers $165_2$-$165_K$ to be loaded with the content of a preceding one of the parallel load registers (i.e., $165_2$ is loaded with the content of $165_1$, $165_3$ is loaded with $165_2$, and so forth). By this arrangement, the symbol latency of a data value stored within any of the parallel-load registers 165 is dependent on how many data values have been shifted into the shift register since the last assertion of the load signal 164; a measure indicated by the shift count. For example, if the shift count is 1, indicating that the load signal 164 was asserted at the immediately preceding edge of RCLK, then the content of storage element $167_1$ of parallel-load register $165_1$ has a symbol latency of i+1 (i.e., one symbol time older than the content of storage element $163_1$ of the shift register). When the next value is shifted into the serial shift register 161, the contents of the parallel registers 165 remain unchanged, meaning that the latency of each data value stored in the parallel registers 165 is increased by a symbol time. Thus, the content latency (i.e., latency of a stored value) of a given storage element within one of parallel registers 165 is dependent upon the value of the shift count. Referring to parallel load register $165_1$, for example, the content latency of storage element $167_1$ is i+SC (SC being the shift count), the content latency of storage element $167_2$ is i+SC+1, and so forth to storage element $167_N$, which has a content latency of i+(N−1)+SC. The content latencies of storage elements within the parallel-load registers $165_2$-$165_K$ are similarly dependent upon the shift clock value, SC, but are increased by N for each parallel load away from register $165_1$. That is, the content latency of the leftmost storage element within register $165_2$ is i+N+SC, and the content latency of the leftmost storage element within register $165_K$ is i+(K−1)N+SC. The content latencies of the storage elements within registers $165_2$-$165_K$ are incrementally related to the content latency of the corresponding leftmost storage element in the same manner that the content latencies of storage elements $167_2$-$167_N$ relate to the content latency of storage element $167_1$.

Figure 11:
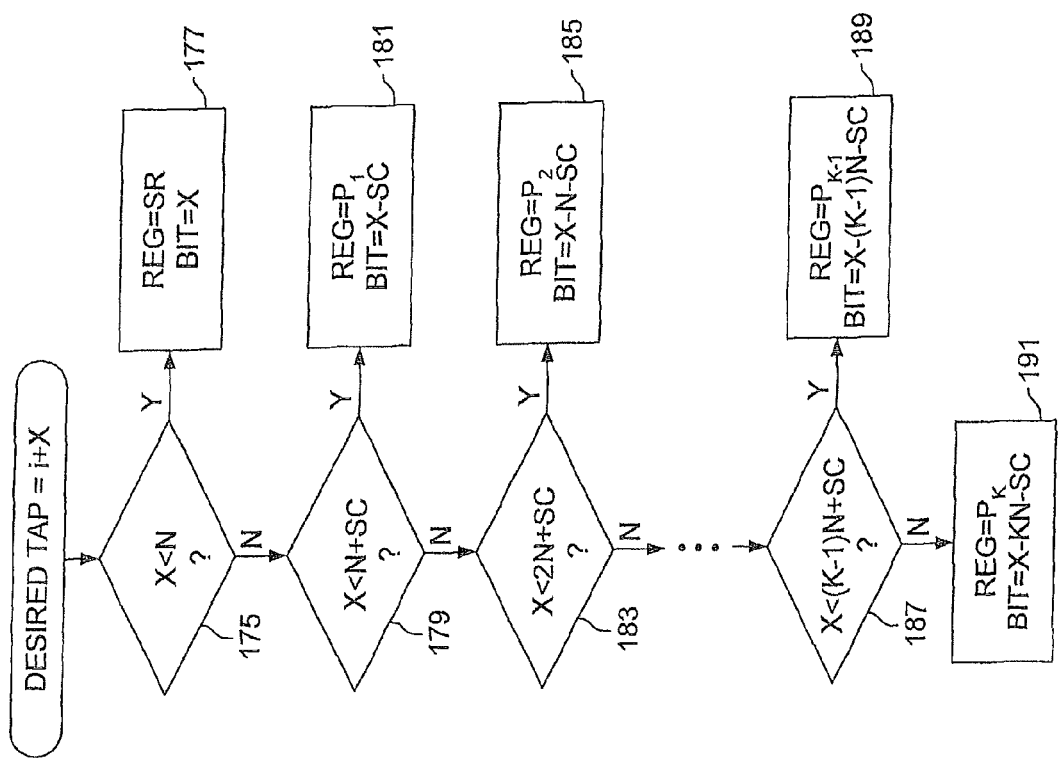
FIG. 11 is a flow diagram of an exemplary method of selecting a data value having desired symbol latency from the buffer of FIG. 10.

FIG. 11 illustrates, in flow diagram form, a method of selecting a data value having symbol latency i+X from the buffer 159 of FIG. 10, i being the content latency of storage element $163_1$. At 175, X is compared with N, the number of storage elements within the shift register 161 and within each of the parallel-load registers 165. If X is less than N, then the desired data value is located within the shift register which, after being initially loaded, always contains data values having symbol latencies ranging from i to i+N−1. Thus, if X is less than N, then as shown at 177, the desired value is in the shift register (REG=SR) at bit position X (BIT=X), where the bit position corresponds to left-to-right numbered storage elements.

If X is not less than N, then the desired data value is located at a shift-count-dependent bit position within one of the parallel-load registers 165. Thus, if X is less than N+SC (179), the desired data value is located within register $165_1$ at bit position X−SC, as indicated at 181. To understand this result, consider what happens if a data value having a desired symbol latency is initially within the rightmost storage element, $167_N$, within parallel-load register $165_1$. As a new value is shifted into the serial shift register 161 and the shift count is incremented, the symbol latency of storage element $167_N$ is increased, and the storage element one position to the left of storage element $167_N$ (i.e., $167_{N−1}$) now contains the data value having the desired symbol latency and is therefore selected to supply the data value to an equalizer tap.

Returning to FIG. 11, if X is greater than or equal to N+SC, then X is compared with 2N+SC at 183. If X is less than 2N+SC, then parallel-load register $165_2$ contains the desired tap value at bit position X−N−SC as indicated at 185. The decision flow continues in this manner to 187 at which point X is compared with (K−1)N+SC. If X is less than (K−1)N+SC, then parallel-load register $165_{K−1}$ contains the desired tap value at position X−(K−1)N−SC as indicated at 189. Otherwise, X is located within the final parallel-load register, $165_K$ at position X−KN−SC as indicated at 191.

Figure 12:
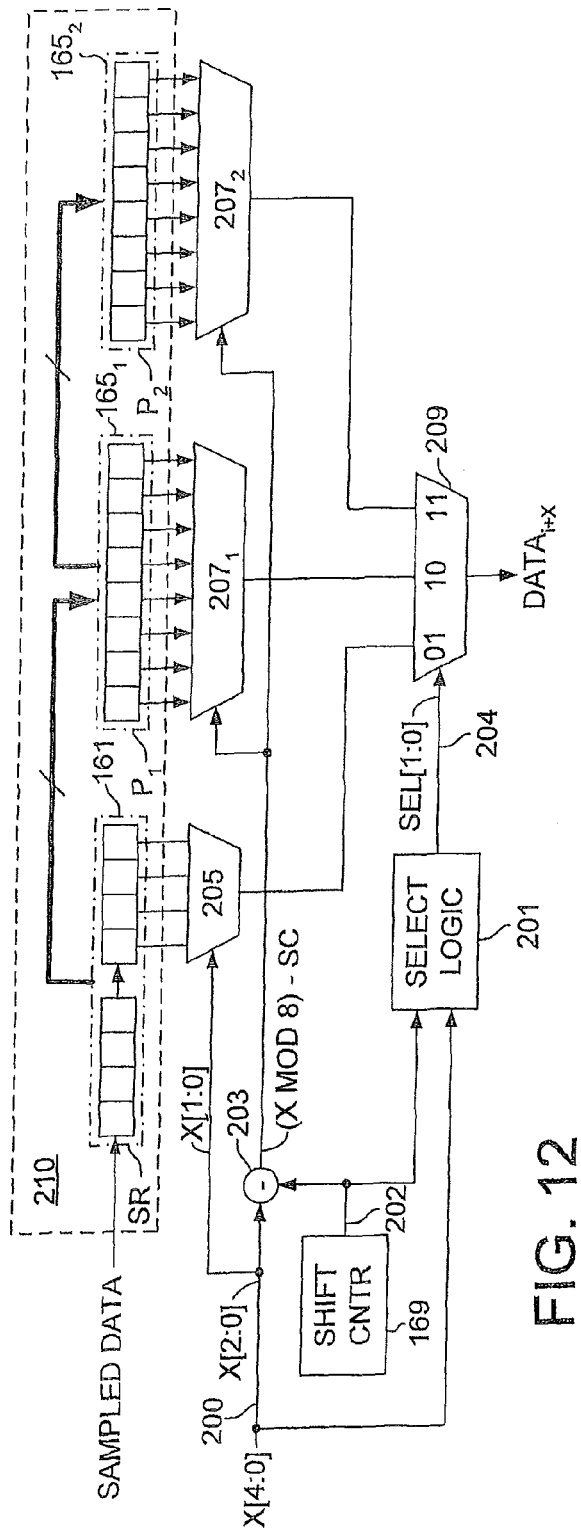
FIG. 12 illustrates an exemplary embodiment of a tap select circuit.

FIG. 12 illustrates an exemplary embodiment of a tap select circuit for selecting a tap value ($DATA_{i+X}$) from a buffer circuit 210 that includes an eight-bit serial shift register 161 and two eight bit parallel-load registers $165_1$, $165_2$. For purposes of illustration, it is assumed that the data value in the first (leftmost) storage element within the shift register 161 has a symbol latency of one and that the dead range is four symbol times (i.e., the leftmost four storage elements within the shift register 161 are not used to source tap values to the equalizer). By this arrangement, immediately after a parallel load operation, the data values stored in parallel-load register $165_1$ will have symbol latencies ranging from 2-9 symbol times, and the data values stored in parallel-load register $165_2$ will have symbol latencies ranging from 10-17 symbol times. Accordingly, reflections (or other distortions) appearing at the receiver input between 5 and 17 symbol times after the corresponding primary signal may be reduced by selecting data values having corresponding symbol latencies from the buffer circuit 210 to drive the receive-side equalizer taps (i.e., to be tap data values). Multiplexers 205, $207_1$ and $207_2$ are responsive to low order bits of a latency value 200 (X[4:0]) to select tap positions within the shift register 161, parallel-load register $165_1$, and parallel-load register $165_2$. The latency value 200 is additionally supplied to a select logic circuit 201 which generates a register select signal, SEL[1:0], to select one of the three registers 161, $165_1$ and $165_2$ within the buffer circuit 210 to source the tap data value, $DATA_{i+X}$. It should be noted that, because the range of tap values extends over 13 possible symbol times (symbol latencies from 5-17), a smaller, four-bit latency value may alternatively be used to select a tap value. As described below, however, using a latency value large enough to select any of the bit positions within the buffer circuit 210 enables the size of the dead range to be adjusted (i.e., programmed) according to application needs.

The least significant two bits of the latency value 200 (i.e., X[1:0]) are input to multiplexer 205 to select one of the four selectable data values within the serial shift register 161. The least three significant bits of the latency value 200 (i.e., X[2:0]) are input to a subtract circuit 203 which subtracts the shift count 202 from the three-bit latency value to produce a tap select value for the parallel-load registers $165_1$, $165_2$. In one embodiment, for example, the select value 200 corresponds to a desired symbol latency as shown in Table 1 below, and the shift count 202 is encoded in a three-bit value, SC[2:0], as shown in Table 2 below. Thus, when the shift count 202 is eight (SC[2:0]=000), and the select value is nine (X[4:0]= 01000), the output of the subtract circuit 203 will be: X[2:0]− SC[2:0]=0; a value that corresponds to the leftmost bit position within each of the parallel-load registers 165. This is a desired result as the leftmost bit positions within registers 165 have symbol latencies 9 and 17 when the shift count is eight. The multiplexer 209 will generate a select signal 204 (SEL [1:0]) to select the data value from register $165_1$ (symbol latency=9) to source the tap data value (this operation is discussed below). As a further example, when the shift count 202 is one and the select value 200 is nine, the output of the subtract circuit 203 will be: 000−001=111 (decimal 7); the rightmost bit position within each of the parallel-load registers 207. Again, this is a desired result as the rightmost bit positions with registers 165 have symbol latencies 9 and 17 when the shift count is one.

TABLE 1

| X[4] | X[3] | X[2] | X[1] | X[0] | Tap Latency |
|---|---|---|---|---|---|
| 0 | 0 | 1 | 0 | 0 | 5 |
| 0 | 0 | 1 | 0 | 1 | 6 |
| 0 | 0 | 1 | 1 | 0 | 7 |
| 0 | 0 | 1 | 1 | 1 | 8 |
| 0 | 1 | 0 | 0 | 0 | 9 |
| 0 | 1 | 1 | 0 | 0 | 10 |

TABLE 1-continued

| X[4] | X[3] | X[2] | X[1] | X[0] | Tap Latency |
|---|---|---|---|---|---|
| 0 | 1 | 1 | 0 | 0 | 11 |
| 0 | 1 | 1 | 0 | 0 | 12 |
| 0 | 1 | 1 | 0 | 0 | 13 |
| 0 | 1 | 1 | 0 | 0 | 14 |
| 0 | 1 | 1 | 0 | 0 | 15 |
| 0 | 1 | 1 | 0 | 0 | 16 |
| 1 | 0 | 0 | 0 | 0 | 17 |

TABLE 2

| SC[2] | SC[1] | SC[0] | Shift Count |
|---|---|---|---|
| 0 | 0 | 1 | 1 |
| 0 | 1 | 0 | 2 |
| 0 | 1 | 1 | 3 |
| 1 | 0 | 0 | 4 |
| 1 | 1 | 0 | 5 |
| 1 | 1 | 1 | 6 |
| 1 | 1 | 1 | 7 |
| 0 | 0 | 0 | 8 |

Figure 13:
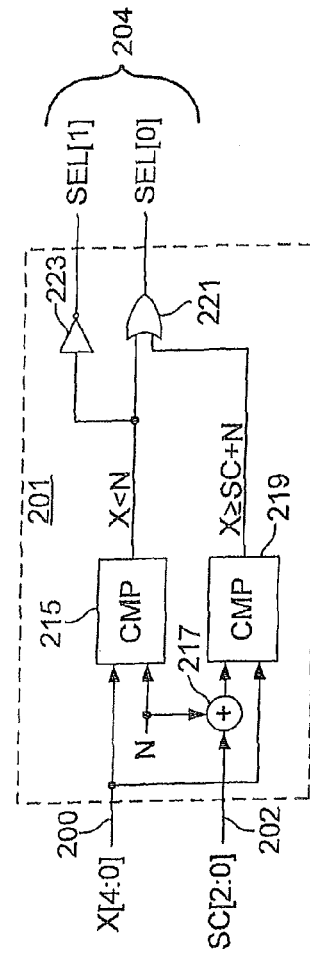
FIG. 13 illustrates an exemplary embodiment of the select logic of FIG. 12.

FIG. 13 illustrates an exemplary embodiment of the select logic 201 of FIG. 12. The select logic 201 includes a comparator circuit 215 to compare the latency select value 200 with N (the size, in bits, of each of registers within buffer circuit 210), a summing circuit 217 to sum the shift count 202 with N (thereby generating SC+N), and a comparator circuit 219 to compare the latency select value 202 with the output of the summing circuit 217. If the latency select value 200 is less than N, the output of comparator 215 will go high, causing inverter 223 to drive the high order bit of select signal 204 low and OR gate 221 to drive the high order bit of the select signal 204 high. That is, SEL[1:0]=01 so that multiplexer 209 will select the shift register 161 to source the tap data value; the desired result when the select value 200 is less than N. If the select value 200 is greater than or equal to N, the output of comparator 215 will go low, thereby driving the high order bit of select signal 204 high, and enabling the output of comparator 219 to control, via OR gate 221, the state of the low order bit of select signal 204. If the latency select value 200 is less than the output of summing circuit 217 (SC+N), the output of comparator 219 will be low causing select signal SEL[0] to be low, thereby producing SEL[1:0]=10 and selecting parallel-load register $165_1$ to source the tap data value. If the latency select value 200 is greater than or equal to the output of the summing circuit 217, the output of comparator 219 will be high, resulting in a select value of SEL[1:0]=11, thereby selecting parallel-load register $165_2$ to source the tap data value.

Reflecting on the structure of FIG. 13, it should be noted that the summing circuit and comparators may have numerous implementations depending on the size of N and the number of bits used to form the latency select value 200 and shift count 202. For example, where the latency select value 200 and shift count 202 have the five- and three-bit configurations shown, and N is eight, the sum of the shift count and N (performed by circuit 217 in FIG. 13) may be formed simply by including an additional bit in parallel with the three shift count bits, the additional bit forming the most significant bit of the resulting sum (i.e., sum[3]) while SC[2:0] form the less significant three bits of the sum (i.e., sum[2:0]). As another example, the comparator 215 may be implemented by a NOR gate having inputs coupled to X[4] and X[3]. By this arrangement, the X<N output will be high only if both X[4] and X[3] are low. Numerous other logic circuits may be used to implement the select logic circuit 201 of FIG. 12 in alternative embodiments. More generally, specific numbers of bits and registers have been described for purpose of example only. Alternative embodiments may include different numbers of registers having various sizes, and latency select values and shift count values having different sizes. Also, any circuit for selecting a data value based on a latency select value may alternatively be used without departing from the spirit and scope of the present invention.

Figures 14, 15:
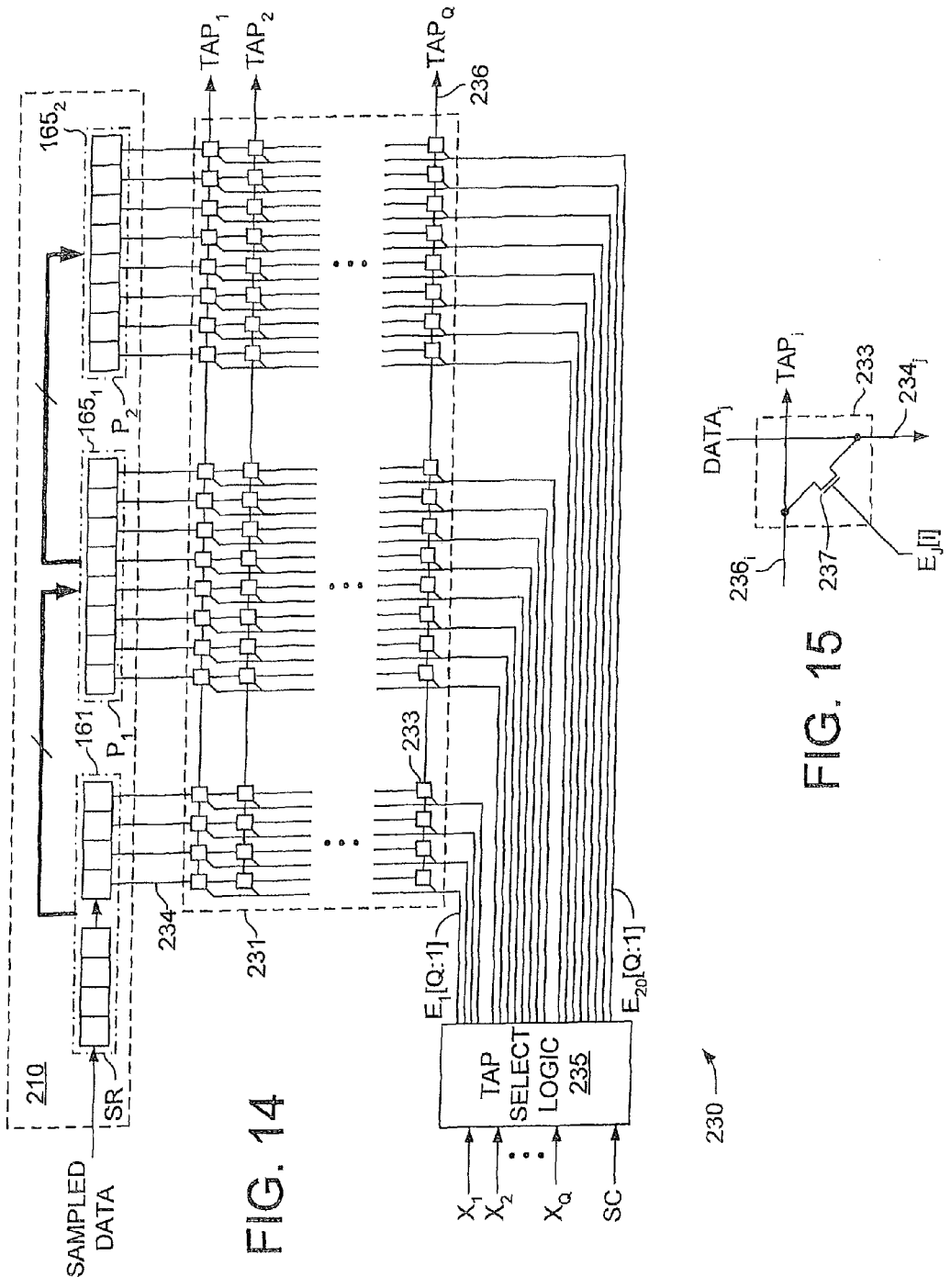
FIG. 14 illustrates a generalized select circuit that may be used to select Q tap values from the buffer circuit of FIG. 12.
FIG. 15 illustrates an embodiment of a switch element that may be used within the switch matrix of FIG. 14.

FIG. 14 illustrates a generalized select circuit 230 that may be used to select Q tap values from the buffer circuit 210 of FIG. 12. The select circuit 230 includes a switch matrix 231 and tap select logic 235. In the embodiment of FIG. 14, each of the possible tap data sources within the buffer circuit 210 (i.e., the rightmost four bits within shift register 161 and all the bits within the parallel-load registers 165) are coupled to respective column lines 234 of the switch matrix 231, and each of the Q tap outputs are coupled to respective row lines 236 of the switch matrix 231. A switch element 233 is provided at each row-column intersection to enable the tap data source for the column to be selectively coupled to the tap output for the row. The tap select logic 235 outputs a respective one of enable signals $E_1$-$E_{20}$ to each column of switch elements based on latency selection values $X_1$-$X_Q$ and shift count, SC. In the embodiment of FIG. 14, each enable signal includes Q component signals coupled respectively to the Q switch elements within a corresponding column. Thus, if the column 1 data value (i.e., the data value stored in shift register position 4), is selected to be the data source for tap Q, then select signal $E_1$[Q:1]=100 . . . 00. More generally, $E_j$[i]=1 for each column data value, j, to be coupled to a tap output, i. By this arrangement, the Q tap outputs may be selected from among the complete range of data values stored within buffer circuit 210. In one embodiment, the select logic includes combinatorial logic that operates as described in reference to FIG. 10 to generate each enable signal. Alternatively, a state machine or other processing logic may be used to generate the enable signals in accordance with the latency selection values and shift count.

FIG. 15 illustrates an embodiment of a switch element 233 that may be used within the switch matrix 231 of FIG. 14. The switch element includes a transistor 235 having source and drain terminals coupled between the $i^{th}$ row line $236_i$ ($TAP_i$) and the $j^{th}$ column line $235_j$ ($DATA_j$) of the switch matrix, and a gate terminal coupled to receive the $i^{th}$ component signal of enable signal j (i.e., $E_j$[i]). Thus, when the $E_j$[i] is high, indicating that $i^{th}$ tap output is to be sourced by the data value at the $j^{th}$ position within the range of selectable data values, transistor 235 is switched on to couple the selected data source to the tap output. Other types of switching elements may be used in alternative embodiments.

Equalizing Circuits

As discussed above in reference to FIG. 3, the tap values selected by the tap select logic 139 and select circuit 128 may be used in a number of different equalizing circuits to counteract distortion events. In one equalizing receiver embodiment, illustrated in FIG. 16, an equalizing output driver 140 is coupled in parallel with the sampling circuit 123 to drive an equalizing signal back onto the signal path 122 during each symbol reception interval (i.e., symbol time during which a valid symbol is present at the input of the receiver). By this arrangement, latent distortions arriving at the receiver during a symbol reception interval may be canceled (or at least reduced) by operation of the equalizing output driver 140.

Figure 16:
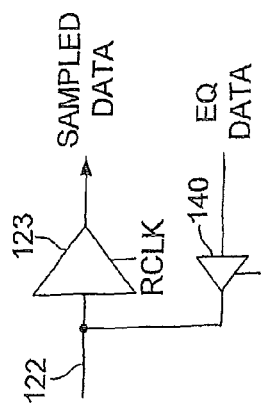
FIG. 16 illustrates an embodiment of an equalizing receiver.
Figure 17:
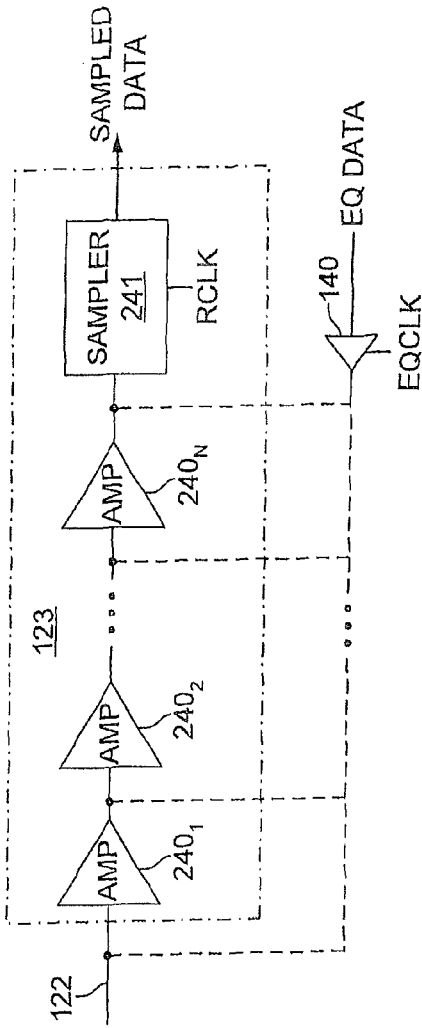
FIG. 17 illustrates the receive circuit of FIG. 16 in greater detail.

FIG. 17 illustrates the receive circuit of FIG. 16 in greater detail. As shown, the sampling circuit 123 may include any number of preamplifiers 240$_1$-240$_N$ coupled in series with a sampler 241. The sampler 241 may be any type of circuit for detecting the level of an input signal, including but not limited to a latching circuit that latches the signal level in response to a rising or falling clock edge, or an integrating circuit that integrates the input signal over a finite period of time (e.g., a symbol time or portion of a symbol time). The equalizing output driver 140 may be coupled to the signal path 122 (i.e., the input of the first preamplifier 240$_1$) or, alternatively, to the output of any of the preamplifiers 240. Also, as discussed below, the output driver 140 may be coupled to the sampler 241 to affect the sampling operation.

Figure 18:
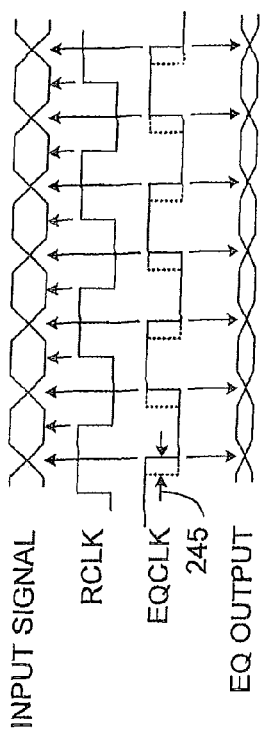
FIG. 18 illustrates an exemplary timing relationship between clock, data and equalization signals in the equalizing receiver of FIG. 16.

In one embodiment, the equalizing output driver 140 of FIGS. 15 and 16 is clocked by an equalizer clock signal, EQCLK, that is offset from the clock signal used to time the sampling instant and therefore to define the symbol reception interval (i.e., receive clock signal, RCLK), as necessary to align edges of the equalizing signal (i.e., state transitions) with edges of the incoming data signal. This timing relationship is illustrated by FIG. 18. As shown, the equalizer clock signal is aligned with edges of the incoming symbol stream so that equalization values are transmitted onto the signal path concurrently with corresponding symbol reception intervals. As discussed below, the equalizer clock signal may be further offset from the receive clock signal as shown by arrow 245 to account for the time required for the equalization data (i.e., selected tap values) to propagate through the equalizing output driver 140 or other equalizing circuit.

Figure 19:
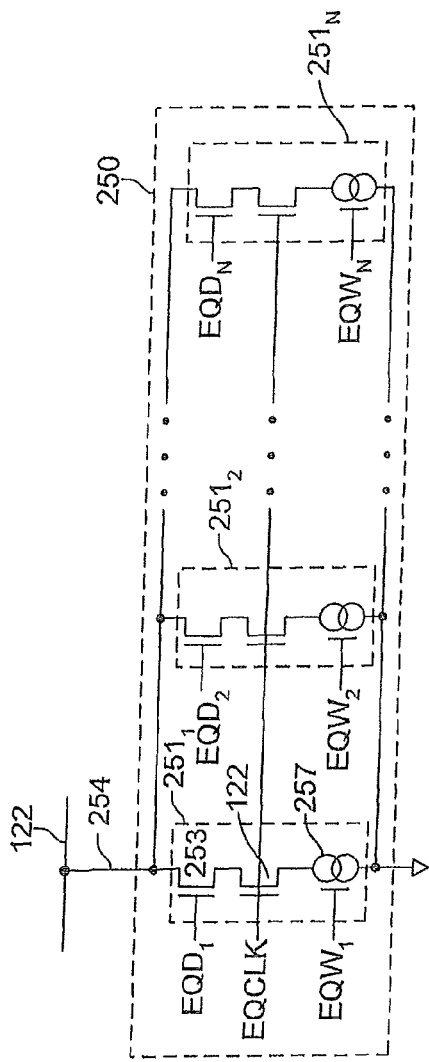
FIG. 19 illustrates a current-sinking output driver that may be used within the equalizing receiver of FIG. 16.

FIG. 19 illustrates a current-sinking output driver 250 that may be used to implement the equalizing output driver 140 of FIG. 16. The output driver includes a plurality of sub-driver circuits 251$_1$-251$_N$, each sub-driver circuit 251 including a current source 257, clocking transistor 122 and data tap transistor 253 coupled in series between an output node 254 and a reference voltage (ground in this example). Control terminals (e.g., gate terminals) of the data tap transistors 253 of the sub-driver circuits 251 are coupled to receive respective data tap values (designated EQD$_1$-EQD$_N$ in FIG. 19) from a select circuit, control terminals of the current sources 257 are coupled to respective tap weight values, EQW$_1$-EQW$_N$, and control terminals of the clocking transistors are coupled in common to receive the equalizer clock signal, EQCLK. By this arrangement, when the equalizer clock signal goes high, each of the sub-driver circuits will source a current according to its respective tap weight and data tap inputs. For example, referring to sub-driver circuit 251$_1$, if tap data value EQD$_1$ is low, no current (or negligible) current will be drawn via output node 254. By contrast, if tap data value EQD$_1$ is high, then the sub-driver circuit 251$_1$ will draw a current from the output node 254 (and therefore from the signal path 122) according to the tap weight, EQW$_1$. As discussed below, the tap weights provided to the output driver 250 or other equalizing circuits described herein may be predetermined values, or may be determined dynamically according to the level of the distortions to be reduced. Because the sub-driver circuits 251 are coupled in parallel to the output node, the overall equalization signal generated by output driver 250 during a given symbol time is the sum of contributions from the individual sub-driver circuits 251. Note that the output driver 250 outputs an equalization signal only when the equalizer clock signal is high (i.e., even phases of EQCLK). An additional instance of output driver 250 may be provided to output an equalization signal when a complement equalizer clock signal (i.e., /EQCLK) is high.

Figure 20:
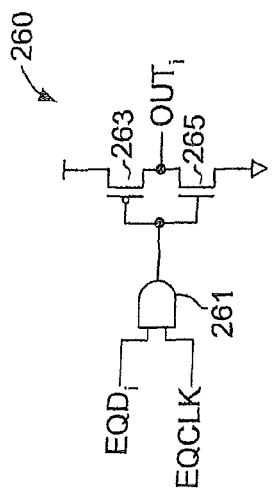
FIG. 20 illustrates an embodiment of a push-pull type of sub-driver circuit that may be used within an equalizing output driver.

FIG. 20 illustrates an embodiment of a push-pull type of sub-driver circuit 260 that may be used within an equalizing output driver instead of the pull-down sub-driver circuits 251 described in reference to FIG. 19. In the push-pull type of sub-driver circuit 260, current is either sourced or sunk via the driver output according to the state of the tap data value, EQD$_i$. The sub-driver circuit 260 includes switching transistors 263 and 265, and AND gate 261. A first input of the AND gate 261 is coupled to receive the tap data value, EQD$_i$, and a second input of the AND gate 261 is coupled to a clock line to receive the equalizer clock signal, EQCLK. The output of the AND gate 261 is coupled to the gate terminals of transistors 263 and 265 such that, during each high phase of the equalizer clock signal, the tap data value is passed to the gate terminals of transistors 263 and 265 to establish the output state of the sub-driver circuit 260. That is, every other half cycle of the equalizer clock signal constitutes an output enable interval for the sub-driver circuit 260. If the tap data value, EQD$_i$, is high during a given output enable interval, transistor 265 is switched on, causing the sub-driver circuit 260 to sink current via the output node (OUT$_i$). Conversely, if the tap data value is low during the output enable interval, transistor 263 is switched on to source current via the output node. Also, though not shown in FIG. 20, a pull-down biasing circuit (e.g., current source) may be coupled between the pull-down data tap transistor 265 and ground, and a pull-up biasing circuit may be coupled between the pull-up data tap transistor 263 and the supply reference voltage (e.g., V$_{DD}$) to enable weighted control of the current sourcing and sinking strength of the push-pull sub-driver circuit 260. Further, an additional instance of the sub-driver circuit 260 may be provided with a complement equalizer clock signal (/EQCLK) and complement tap data value (/EQD$_i$) being input to AND gate 261 to enable the sub-driver circuit 260 to output an equalizing signal during the alternate half cycle of the equalizer clock signal.

Figure 21:
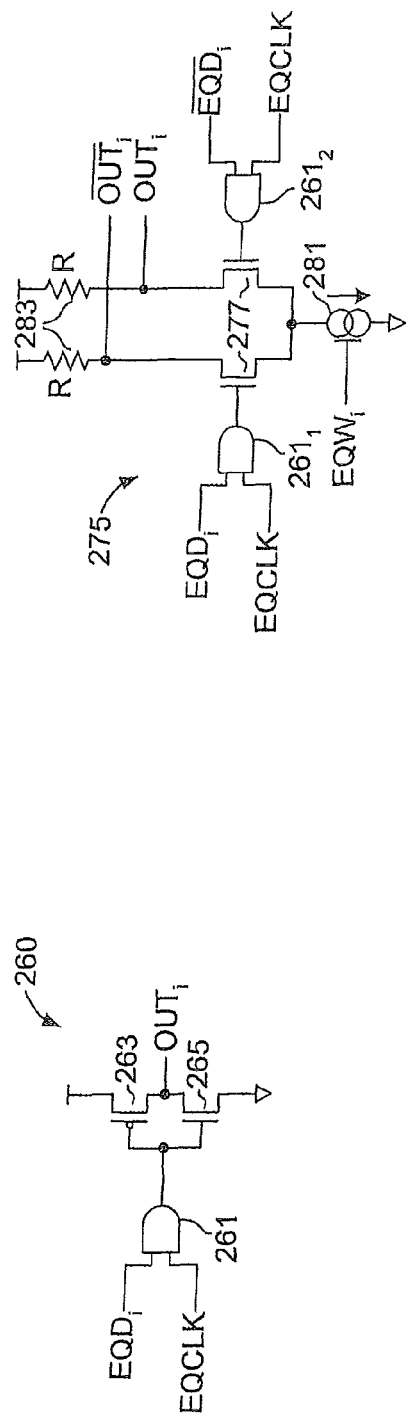
FIG. 21 illustrates another embodiment of a sub-driver circuit that may be used within an equalizing output driver.

FIG. 21 illustrates another embodiment of a sub-driver circuit 275 that may be used within an equalizing output driver. The sub-driver circuit 275 includes a differential transistor pair 277 having control terminals coupled to outputs of AND gates 261$_1$ and 261$_2$, respectively. A tap data value (EQD$_i$) and an equalizer clock signal (EQCLK) are input to AND gate 261$_1$, and a complement of the tap data value (/EQD$_i$) and the equalizer clock signal are input to AND gate 261$_2$. By this arrangement, the tap data value and complement tap data value are applied to respective inputs of the differential pair 277 during every other half cycle of the equalizer clock signal. Output nodes of the differential pair 277 are pulled up through respective resistive loads 283 (R), and source terminals of the differential pair are coupled to ground via a current source 281. The resistive loads 283 may be, for example, termination elements coupled to the signal path (not shown) rather than resistive elements included within the sub-driver circuit 275. Accordingly, the sub-driver circuit 275 is enabled, during every other half cycle of the equalizer clock signal, to output a differential equalizing signal on output nodes OUT$_i$ and /OUT$_i$ in accordance with the complementary tap data values, EQD$_i$ and /EQD$_i$. A counterpart instance of sub-driver circuit 275 may be provided to generate a differential equalizing signal during the alternate half clock cycle of the equalizer clock signal. The current source 281 is controlled by the tap weight value, EQW$_i$, in the manner described in reference to FIG. 19, though different weighting schemes may be used in alternative embodiments (e.g., using weight-biased pull-up elements in place of resistive elements 283).

Figure 22:
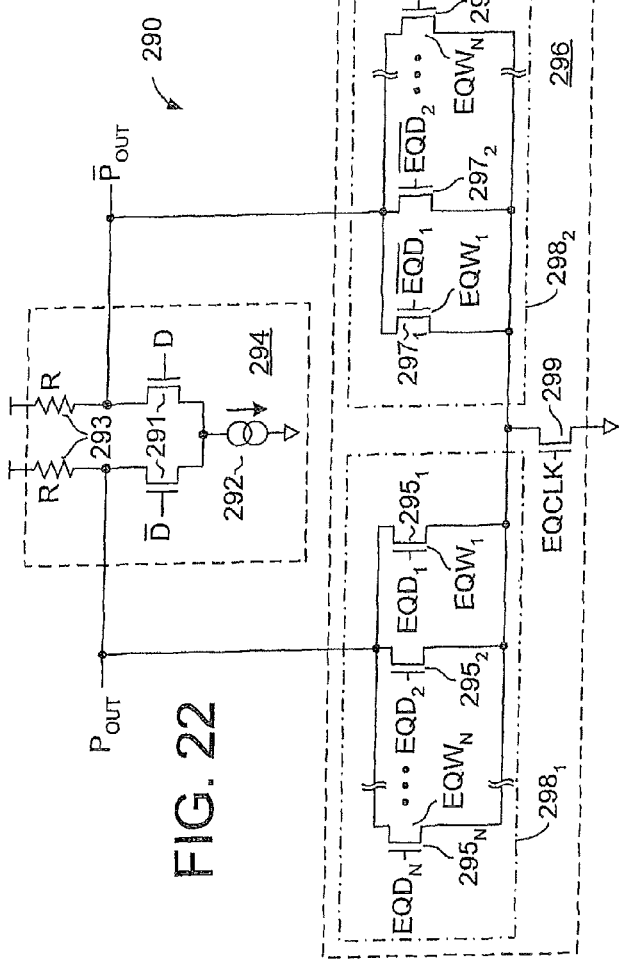
FIG. 22 illustrates an alternative type of equalizing circuit that may be used in embodiments of the invention.

FIG. 22 illustrates an alternative type of equalizing circuit 290 that may be used in embodiments of the invention. Instead of driving an equalization signal onto the signal path to affect the signal level of an incoming signal, equalization is performed in conjunction with preamplification of the incoming signal, and therefore affects the level of preamplification applied to the incoming signal. That is, the equalizing circuit 290 affects the preamplified signal level instead of the signal level present on the signaling path.

Equalizing circuit 290 includes a differential amplifier 294 formed by differential transistor pair 291, biasing current source 292 and resistive loads 293. Differential input signals are supplied to gate terminals of transistor pair 291 such that differentially amplified output signals are generated on output lines $P_{OUT}$ and $/P_{OUT}$. In one embodiment, output lines $P_{OUT}$ and $/P_{OUT}$ are coupled to input terminals of a differential amplifier within a sampling circuit so that amplifier 294 effectively forms a first stage in a two-stage amplifier (i.e., amplifier 294 is a preamplifier).

Equalizing circuit 290 additionally includes a level shifting circuit 296 coupled to the differential amplifier 294 to provide preamplifier equalization. The level shifting circuit 296 includes a pair of sub-circuits $298_1$ and $298_2$ each coupled between a respective one of the differential amplifier outputs ($P_{OUT}$ and $/P_{OUT}$) and a clocking transistor 299. Each of the signal subcircuits 298 includes a respective plurality of data tap transistors ($295_1$-$295_N$ and $297_1$-$297_N$) coupled in parallel between the differential amplifier output and the clocking transistor 299. The control terminals of the data tap transistors $295_1$-$295_N$ are coupled to receive the selected data tap values, $EQD_1$-$EQD_N$, respectively, and the control terminals of the data tap transistors $297_1$-$297_N$ are similarly coupled to receive complement versions of the selected data tap values, /EQD1-/EQDN. In one embodiment, each of the data tap transistors 295 is sized (e.g., by width-length ratio) to achieve a respective tap weight $EQW_N$-$EQW_1$. By this arrangement, each data tap value may be coupled to the control terminal of a selected one of the data tap transistors 295 according to the desired tap weight. The transistors 297 are similarly weighted and therefore allow coupling of the complement data tap values according to desired tap weights. The weights of the individual data tap transistors 295 (and 297) may be incrementally related (i.e., $EQW_1=EQW_2+K=EQW_3+2K\ldots$, where K is a constant), exponentially related (i.e., $EQW_1=EQW_2*K=EQW_3*K^2\ldots$) or may have any other desired relationship (including having the same weight values or including subsets of weight values that are the same).

The clocking transistor 299 is switched on during every other half cycle of the equalizer clock signal to enable the operation of the subcircuits 298. The subcircuits 298 operate to increase or decrease the difference between the preamplified output signals (or even change the polarity of the difference) by drawing more current from one of the preamplifier output lines ($P_{OUT}$ or $/P_{OUT}$) than the other in accordance with the selected data tap values. Thus, the subcircuits 298 act to differentially shift the level of the preamplified output signal generated by differential amplifier 294. An additional instance of the equalizing circuit 290 may be provided to enable preamplifier equalization during the alternate half cycle of the equalizer clock signal.

Figure 23:
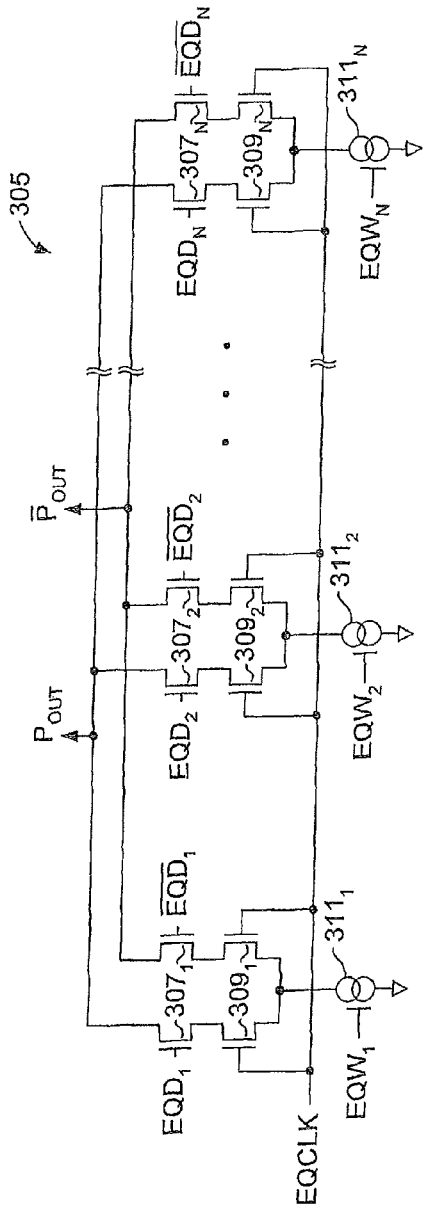
FIG. 23 illustrates an embodiment of a level shifting circuit that may be used within the equalizing circuit of FIG. 22.

FIG. 23 illustrates an alternative level shifting circuit 305 that may be substituted for circuit 296 of FIG. 22. In circuit 305, differential pairs of data tap transistors $307_1$-$307_N$ are coupled to output lines POUT and /POUT in the same manner as in circuit 296, but instead of sizing the data tap transistors to achieve tap weighting, tap weighted current sources $311_1$-$311_N$ are coupled in series with the differential pairs of data tap transistors $307_1$-$307_N$, respectively. For example, current source $311_1$ is controlled by (i.e., draws a bias current according to) weight value $EQW_1$ and is coupled via clocking transistors $309_1$ to data tap transistors $307_1$. Similarly, current source $311_2$ is controlled by weight value $EQW_2$ and is coupled via clocking transistors $309_2$ to transistors $307_2$, and so forth. By this arrangement, the weight values $EQW_1$-$EQW_N$ may be configured (e.g., via run-time calibration or production time programming) as necessary to establish a desired equalizing signal contribution from each differential pair of data tap values 307. An additional instance of the equalizing circuit 290 may be provided to enable preamplifier equalization during the alternate half cycle of the equalizer clock signal (i.e., by driving clocking transistors 309 with complement equalizing clock, /EQCLK).

FIG. 24 illustrates another type of equalizing circuit 320 that may be used in embodiments of the invention. Instead of driving an equalization signal onto the signal path to affect the signal level of an incoming signal, or affecting the preamplified signal level, a level shifting circuit 330 is coupled to low impedance inputs of a differential sampling circuit 328, and is used to affect the level of the input signal before the sampled signal is captured. The sampling circuit includes differential transistor pair 329 to precharge input nodes $S_{IN}$ and $/S_{IN}$ according to the state of a differential input (e.g., the output of a preamplifier 294 of FIG. 22, or a differential data signal), during a first half cycle of the receive clock (which enables clocking transistor 331). During a second half cycle of the receive clock signal, transistors 321 and 325 are switched on by the low-going receive clock signal, thereby enabling a cross-coupled latch formed by transistors 322, 323, 325 and 326 to latch the state of the precharged signal levels on nodes $S_{IN}$ and $/S_{IN}$.

The level shifting circuit 330 is similar to the circuit 296 of FIG. 22 except that clocking transistor 341 is enabled by the receive clock signal (RCLK) instead of the equalizer clock signal, the equalizer clock signal being used to switch on switching transistors $335_1$-$335_N$ and $339_1$-$339_N$ during every other half cycle. Data tap transistors $333_1$-$333_N$, which are controlled by respective tap data values $EQD_1$-$EQD_N$, are coupled in series with the switching transistors $335_1$-$335_N$, respectively. Similarly, data tap transistors $337_1$-$337_N$ are coupled in series with switching transistors $339_1$-$339_N$ and are controlled by respective complement tap data values /$EQD_1$-/$EQD_N$. In one embodiment, the data tap transistors 333, 337 and switching transistors 335, 339 are sized to provide different current draws according to predetermined weights, EQW1-EQWN, thereby permitting different data taps to make different level-shifting contributions. In one embodiment, for example, the switching transistors 335 and 339 are binary weighted such that, when switched on, the current draw through transistor pair $333_N/335_N$ is $2^{N-1}$ times the current through transistor pair $333_1/335_1$ (and the current draw through transistor pair $337_N/339_N$ is $2^{N-1}$ times the current through transistor pair $337_1/339_1$. Other weighting schemes may also be used including, without limitation, thermometer coding of high-gain transistor pairs, linear weighting schemes, or any combination of exponential (e.g., binary), linear and thermometer coded weightings.

In one embodiment, the equalizer clock is phase advanced relative to the receive clock signal such that transistors 337 and 339 are switched on in advance of clocking transistor 341. By this arrangement, transistors 333 and 337 are poised to shift the level of the sampling circuit input nodes, $S_{IN}$ and $/S_{IN}$, when the receive clock signal goes high. Thus, when the receive clock signal goes high, sampling circuit input nodes $S_{IN}$ and $/S_{IN}$ are differentially discharged according to the tap data values $EQD_1$-$EQD_N$, $/EQD_1$-$/EQD_N$ and the respective weights of transistors 333 and 337. Consequently, the signal levels at the input nodes, $S_{IN}$ and $/S_{IN}$, of sampling circuit 328 are differentially shifted by the level shifting circuit 330 to reduce static offsets in the incoming data signal (applied to control terminals of differential pair 329) caused by reflections or other distortions.

FIG. 25 illustrates an alternative level shifting circuit 342 that may be substituted for circuit 330 of FIG. 24. The level shifting circuit 342 includes data tap transistors 333, 33 and equalizer-clock-enabled switching transistors 335, 339 coupled as described in reference to FIG. 24. However, rather than being coupled to a clocking transistor 335, the source terminals of transistors $335_1$-$335_N$ are coupled to ground via capacitive elements $334_1$-$334_N$, respectively, and the source terminals of transistors $339_1$-$339_N$ are similarly coupled to ground via capacitive elements $338_1$-$338_N$. By this arrangement, respective variable capacitances are coupled to the low impedance inputs, $S_{IN}$ and $/S_{IN}$, of the sampling circuit 328 according to the states of the tap data values $EQD_1$-$EQD_N$ and complement data tap values $EQD_1$-$EQD_N$ applied to the inputs of data tap transistors 333 and 337. Thus, different levels of capacitance are added to the sampling circuit input nodes, $S_{IN}$ and $/S_{IN}$, according to the tap data values, effectively changing the discharge rates of the input nodes and therefore affecting the precharged signal level at the input nodes as desired to reduce signal distortions. In the embodiment of FIG. 25, the data tap transistors 333, 337 and switching transistors 335, 339 have uniform sizes (i.e., uniform weighting), and the capacitive elements 334, 338 have weighted capacitive values to permit a broad range of capacitances to be coupled to the input nodes of sampling circuit 328. For example, in one embodiment, the capacitive elements 334 are implemented by source-to-drain coupled transistors and are binary weighted (e.g., by adjusting transistor width-length ratios) such that capacitive element $335_2$ has twice the capacitance of capacitive element $335_1$, and capacitive element $335_N$ has $2^{N-1}$ times the capacitance of capacitive element $335_1$. Other weighting relationships (e.g., thermometer coding, linear, uniform, etc.) may also be used. Also, the data tap transistors 333, 337 and/or switching transistors 335, 339 may be weighted in alternative embodiments instead of (or in addition to) the capacitive elements 334, 338.

High Speed Tap Selector

As discussed above in reference to FIG. 3, an incoming data signal may include two symbols per receive clock cycle (sometimes referred to as a "double data rate" signal), and each symbol may have more than two possible states (i.e., may have a signal level falling within more than two distinct ranges of signals). Also, the receive clock frequency may be so high that by the time a sampled data value is loaded into the buffer circuit 132, the data value already has a latency of several symbol times. All these factors present challenges to the buffering and selection of tap values described in reference to FIG. 3.

Figure 26:
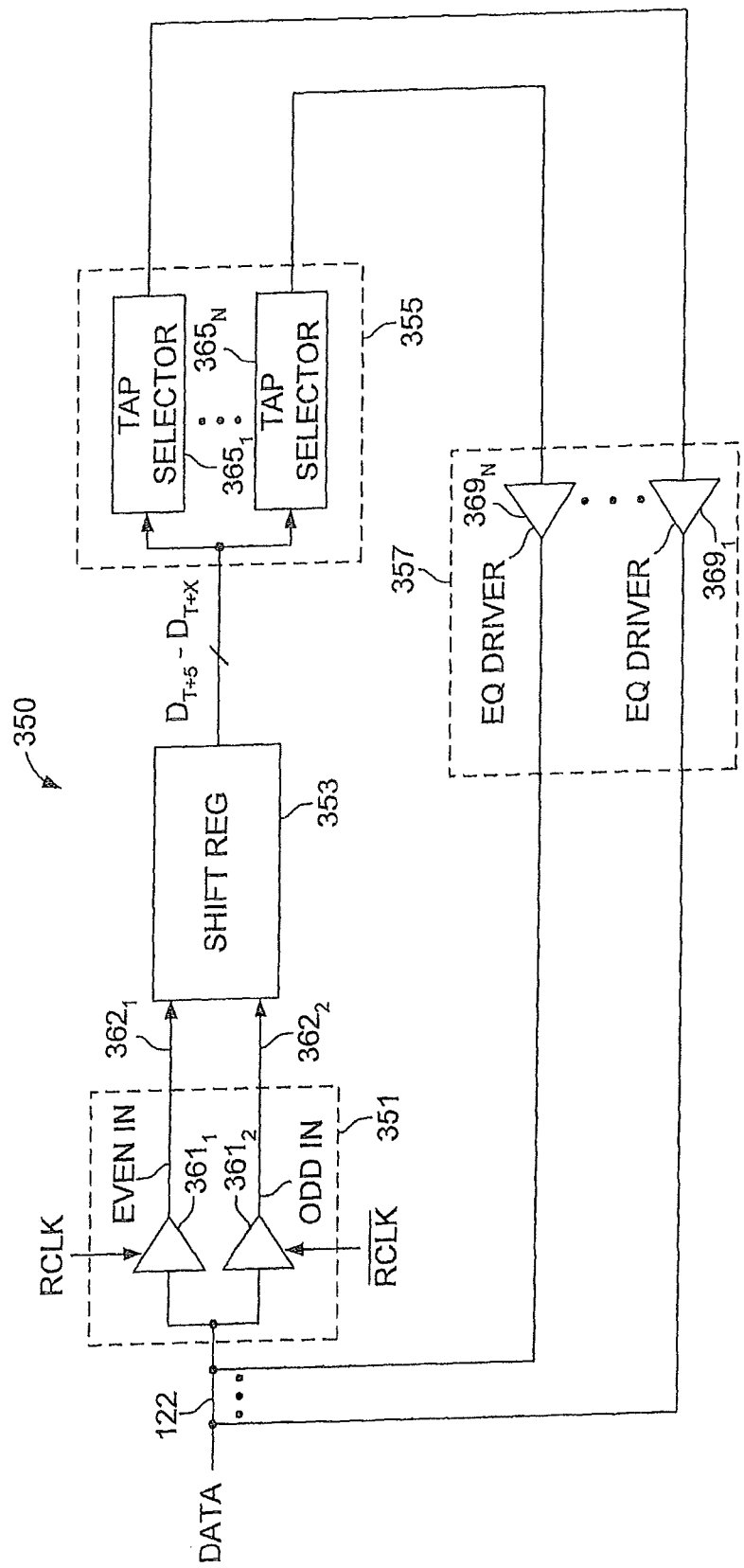
FIG. 26 illustrates an equalizing receiver according to an embodiment of the invention.

FIG. 26 illustrates an equalizing receiver 350 according to an embodiment of the invention. The receiver 350 includes a double data rate sampling circuit 351, shift register 353, select circuit 355 and equalizing output driver 357. The sampling circuit 351 includes a pair of sub-circuits $361_1$ and $361_2$ to sample the incoming data signal in response to rising edges in the receive clock (RCLK) and complement receive clock (/RCLK), respectively. Falling clock edges may alternatively be used to time the sampling instant. Data samples captured in response to edges of the receive clock are referred to herein as even phase data, and data samples captured in response to edges of the complement receive clock are referred to as odd phase data. Thus, sampling circuit 351 outputs even phase data (EVEN IN) and odd phase data (ODD IN) to the shift register 353 via signal lines $362_1$ and $362_2$, respectively. The even and odd phase data values are stored within the shift register to provide a source of selectable tap values to the select circuit 355. In the embodiment of FIG. 26, the dead range is assumed to be five symbol latencies (other dead ranges may be used) such that data values $D_{T+5}$-$D_{T+X}$ are provided to the select circuit 355, subscript T+5 indicating a latency of five symbol times relative to sampling instant, T. The select circuit 355 includes N tap selectors, $365_1$-$365_N$, that select from among the plurality of data values stored within the shift register 353 and output a selected tap data value to a respective one of N output sub-drivers $369_1$-$369_N$ within the equalizing output driver 357. Each of the output sub-drivers 369, in turn, drives a component equalizing signal onto the signal path 122. In alternative embodiments, the equalizing output driver 357 may be replaced by an equalizing circuit that operates within a preamplifier circuit (not shown in FIG. 26) or sampling circuit 351 as described above in reference to FIGS. 17-20.

Figure 27:
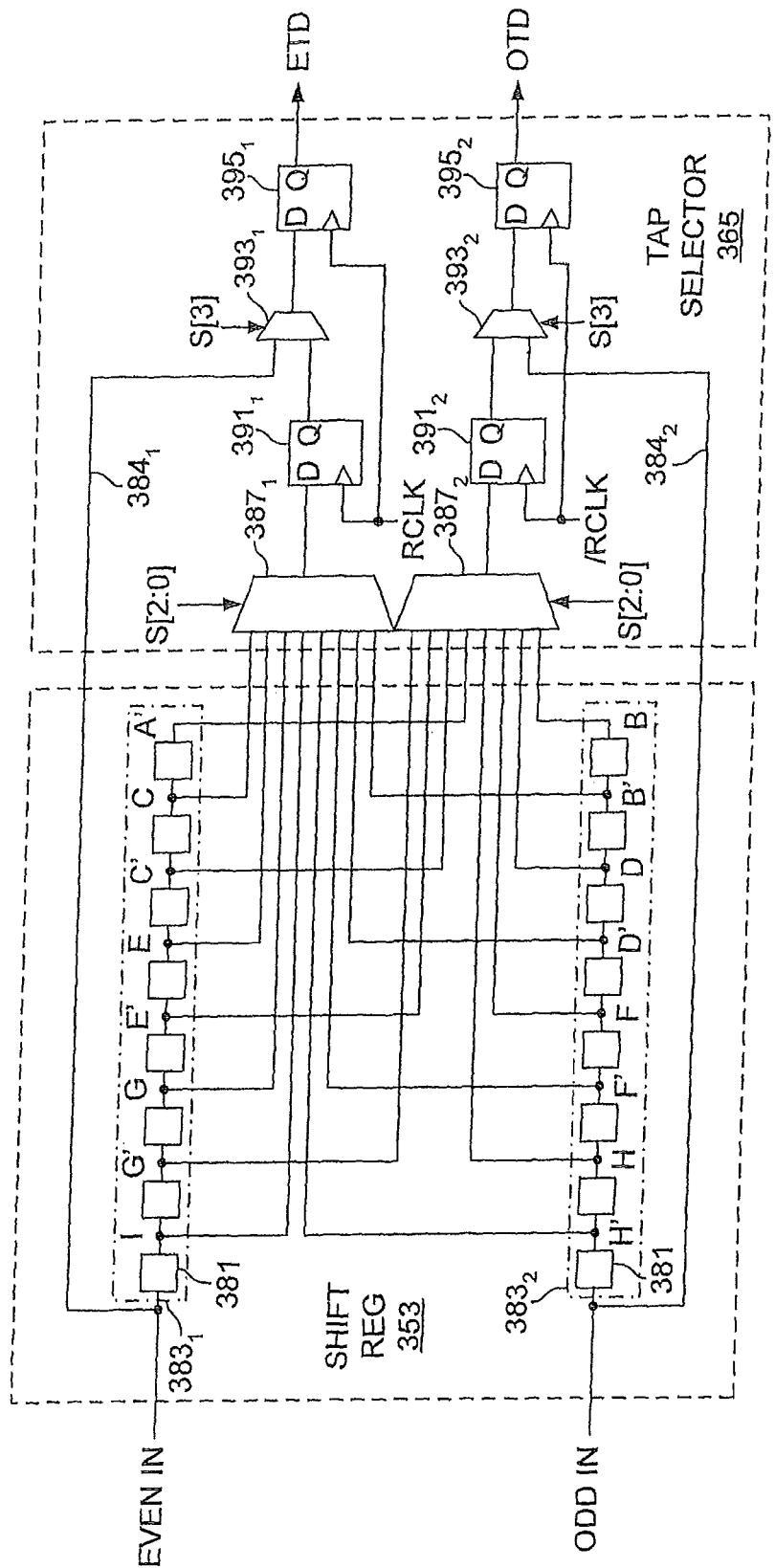
FIG. 27 illustrates a shift register and tap selector that may be used within the equalizing receiver of FIG. 26.

FIG. 27 illustrates the shift register 353 and one of the tap selectors 365 of FIG. 26 according to more specific embodiments. The shift register includes a pair of shift sub-circuits $383_1$ and $383_2$ to store even phase data and odd phase data, respectively. In one embodiment, each of the shift sub-circuits 383 includes a number of storage elements 381 (e.g., latches) coupled in a daisy chain configuration (i.e., output to input) to enable an input data value to be shifted progressively from a first (i.e., leftmost) storage element 381 in the chain to a last (rightmost) storage element 381 in the chain. Each of the shift sub-circuits 383 is responsive to the receive clock and complement receive clock signals such that the contents of each shift sub-circuit 383 is shifted during each half clock cycle of the receive clock signal. Thus, assuming that a stream of incoming symbols includes the data sequence A, B, C, D, etc., then even phase data values A, C, E, G, I, etc. will be shifted into shift sub-circuit $383_1$ and odd phase data values B, D, F and H will be shifted in to shift sub-circuit $383_2$. Because the contents of the shift sub-circuit $383_1$ are shifted twice per even phase data reception, two instances of each even phase data value will be stored in the shift sub-circuit $383_1$. The second instance of each even phase data value stored in shift sub-circuit $383_1$ is designated by a prime (i.e., ') in FIG. 27 to indicate that the data value was loaded synchronously with the loading of a newly received odd phase data value into shift sub-circuit $383_2$. Similarly, two instances of each odd phase data value are stored in the shift sub-circuit $383_2$, with the second instance of the odd phase data value being designated by a prime to indicate that the data value was loaded synchronously with the loading of a newly received even phase data value into shift sub-circuit $383_1$. Thus, from the perspective of the tap selector 365, the shift sub-circuits 383 collectively contain a sequence of data values, A', B, C', D, E' F, G', H, that may be used to generate odd phase equalizing signals (i.e., driving an equalizing signal onto the signal path or affecting signal levels within a preamplifier or sampling circuit during odd phase symbol reception), and a sequence of data values, B', C, D', E, F', G, H', I, that may be used to generate even phase equalizing signals. Accordingly, the outputs of each of the storage elements 381 within shift sub-circuit $383_1$ are coupled to respective inputs of an even tap data select circuit 387₁ within the tap selector 365, and the outputs of each of the storage elements 381 within the shift sub-circuit 383₂ are coupled to respective inputs of an odd tap data select circuit 387₂ within the tap selector 365. The even and odd tap data select circuits 387 are responsive to a select signal, S[2:0], to output selected tap data values from the even and odd phases sequences of data values, respectively. The select signal may be generated, for example, by tap the select logic 139 described in reference to FIG. 3.

The output of the even tap data select circuit is clocked into a flip-flop 391₁ (or other storage element) at the rising edge of the receive clock signal (RCLK) so that, at any given time, the output of flip-flop 391₁ is delayed by two symbol times relative to the most latent data value supplied to the even tap data select circuit 387₁. Similarly, the output of the odd tap data select circuit 387₂ is clocked into a flip-flop 391₂ (or other storage element) so that, at any given time, the output of flip-flop 391₂ is delayed by two symbol times relative to the most latent data value supplied to the odd tap data select circuit 387₂. Thus, the flip-flops 391 effectively increase the latency of selected even and odd data tap values by two symbol times. Select circuits 393₁ and 393₂ are provided to extend the overall latency range of the even and odd data tap selections within tap selector 365 by allowing selection of tap data directly from the even and odd data inputs to the shift register 353 (i.e., EVEN IN and ODD IN) or from the outputs of flip-flops 391. Select bit S[3] is provided (e.g., by the tap select logic 139 of FIG. 3) to select between the fast path data (i.e., connections 384₁ and 384₂ to the inputs of the sub shift circuits 383) and the selected data values stored in flip-flops 391. Flip-flops 395₁ and 395₂ (or other storage elements) are provided to synchronize the outputs of multiplexers 393₁ and 393₂ with the receive clock and complement receive clock, respectively. Thus, even and odd data tap values, ETD and OTD, each having a range of latencies according to the depth of the shift sub-circuits 383 and the number of fast path taps (of which signal lines 384₁ and 384₂ are examples) are output to the equalizing circuit (not shown in FIG. 27) to enable even and odd phase equalization of an incoming signal.

Figure 28:
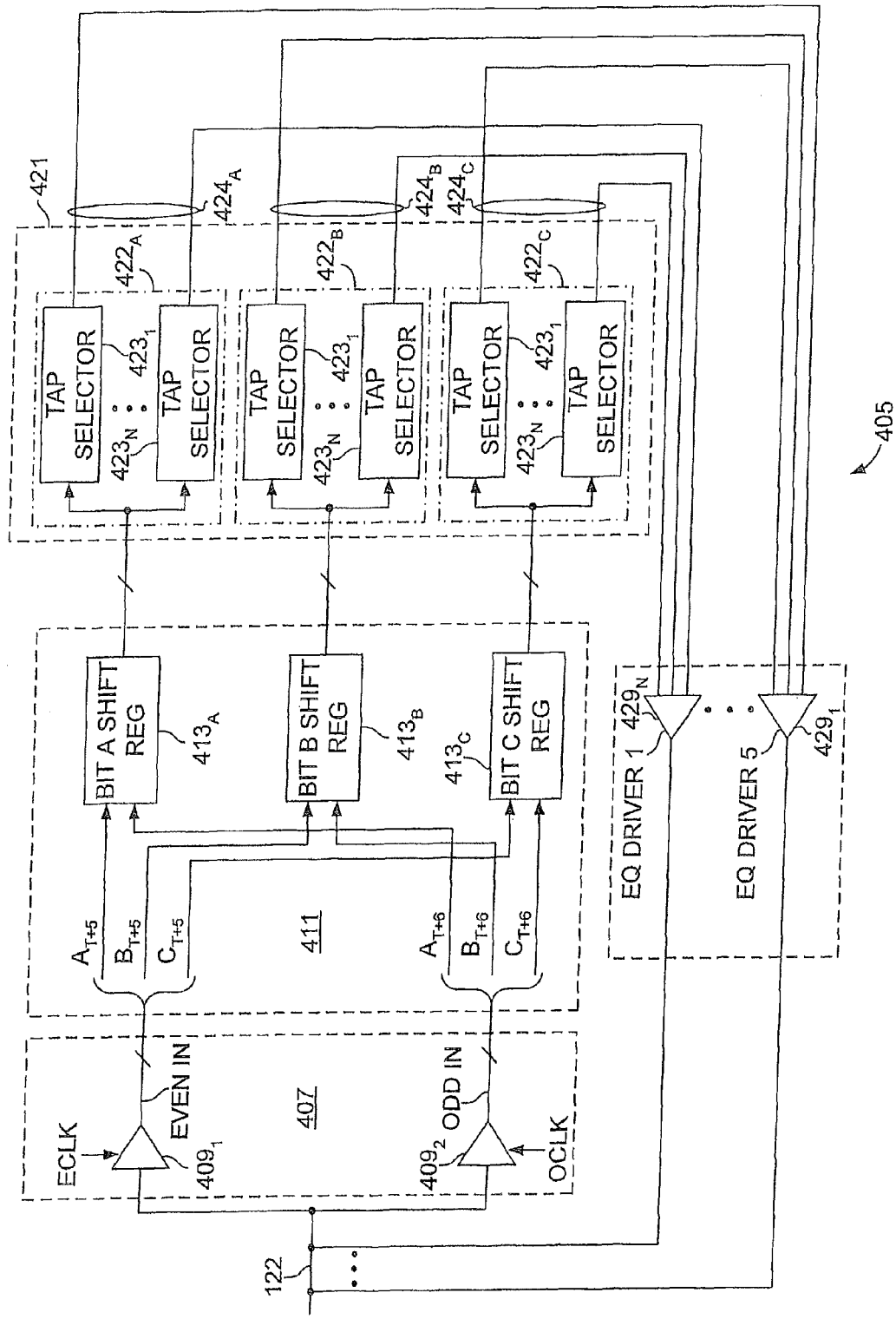
FIG. 28 illustrates an equalizing receiver for receiving a double data rate, multilevel input signal according to an embodiment of the invention.

FIG. 28 illustrates an equalizing receiver 405 for receiving a double data rate, multilevel input signal according to an embodiment of the invention. The receiver 405 includes a sampling circuit 407, shift register 411, select circuit 421 and equalizing output driver 427. The sampling circuit includes even and odd phase sampling sub-circuits 409₁ and 409₂ to capture even and odd phase samples of the incoming multi-level data signal and to generate a multi-bit output indicative of the sampled signal level. For example, in one embodiment, the incoming data signal has one of four possible signal levels, each level being defined by a distinct range of voltages. In the specific embodiment depicted in FIG. 28, each sample is resolved (i.e., by sampling sub-circuits 409) to a thermometer code in which bits A, B, and C have values according to which of four voltage ranges the sampled signal level falls within. Referring to FIG. 29, for example, bits A, B and C are set according to the following relationships between the sampled signal, $V_S$, and high, middle and low threshold voltage levels:

TABLE 3

| Sampled Signal Level, $V_S$ | C | B | A |
|---|---|---|---|
| $V_S > T_H$ | 0 | 0 | 0 |
| $T_H > V_S > T_M$ | 0 | 0 | 1 |
| $T_M > V_S > T_L$ | 0 | 1 | 1 |
| $T_L > V_S$ | 1 | 1 | 1 |

Other encoding schemes may be used in alternative embodiments. Also, more or fewer threshold levels (and therefore signal ranges) may be used, and current levels may be used to indicate signal level instead of voltage levels.

Once the sampled signal is resolved to a pattern of binary bits, A, B and C (or some other number of bits), each of the bits is input to a respective one of shift registers 413$_A$-413$_C$ and used to source a tap value for selection by a respective set of select circuits 422$_A$-422$_C$ (each select circuit including N tap select selectors 423₁-423$_N$). Each of the shift registers 413 and select circuits 422 operates generally as described in reference to FIGS. 21 and 22 to generate a set of selected tap values, 424$_A$-424$_C$. Corresponding tap values from within each set 424 are provided to a respective one of output sub-drivers 429₁-429$_N$ within equalizing output driver 427, where they are used to generate a multi-level equalization signal. For example, the tap values output by tap selector 423₁ within each of the select circuits 422 are input to output sub-driver 429₁ of the equalizing output driver 427.

Equalization Clock Signal Generation

As discussed briefly in reference to FIG. 18, it is desirable for the equalization signal generated by a receive-side equalizing output driver to be driven onto the signal path in phase alignment with data eyes in the incoming data signal. While the receive clock (or complement receive clock) may be used to clock the equalizing output driver (or preamp or sampling circuit equalizer), propagation delay through the equalizing driver tends to become significant in high frequency systems, producing undesired timing offset between the incoming data signal and the equalization signal. In one embodiment, clock data recovery circuitry within an equalizing receiver is used to generate an equalization clock signal (EQCLK) that is phase advanced relative to the receive clock signal according to the propagation delay (i.e., clock-to-Q) of an equalizing output driver. By this timing arrangement, illustrated in FIG. 30, the equalizing output driver outputs an equalization signal having the desired phase relation with the incoming data signal. As shown, by advancing the equalization clock relative to the receive clock according to the clock-to-Q delay of the equalizing output driver, a desired phase relationship between the incoming data signal (RX DATA) and equalization signal (EQ DATA) is achieved. Note that, in the exemplary diagram of FIG. 30, the equalization data tap is assumed to have a symbol latency of five symbol times, such that an equalization signal based on received symbol A is transmitted by the equalizing output driver during the reception interval for symbol F.

FIG. 31 illustrates an embodiment of an equalizing receiver 450 that generates receive and equalization clock signals having the phase relationship shown in FIG. 30. The receiver 450 includes a sampling circuit 451, shift register 453, clock-data-recovery (CDR) circuit 457, application logic 455, tap data selector 461, signal generator 462, equalizer clock generator 459, and equalization data source selector 463. An incoming data signal (DATA) on signal path 122 is sampled by the sampling circuit 451 in response to a receive clock signal (RCLK). The samples are output to the shift register 453 where they are stored for parallel output to the application logic 455 and the CDR circuit 457. In the embodiment of FIG. 31, the receive clock signal includes multiple component clock signals including a data clock signal and its complement for capturing even and odd phase data samples, and an edge clock signal and complement edge clock signal for capturing edge samples (i.e., transitions of the data signal between successive data eyes). The data and edge samples are shifted into the shift register 453 and then supplied as parallel words (i.e., a data word and an edge word) to a phase control circuit 467 within the CDR circuit 457. The phase control circuit 467 compares adjacent data samples (i.e., successively received data samples) within the data word to determine when data signal transitions have taken place, then compares an intervening edge sample with the preceding data sample (or succeeding data sample) to determine whether the edge sample matches the preceding data sample or succeeding data sample. If the edge sample matches the data sample that preceded the data signal transition, then the edge clock is deemed to be early relative to the data signal transition. Conversely, if the edge sample matches the data sample that succeeds the data signal transition, then the edge clock is deemed to be late relative to the data signal transition. Depending on whether a majority of such early/late determinations indicate an early or late edge clock (i.e., there are multiple such determinations due to the fact that each edge word/data word pair includes a sequence of edge and data samples), the phase control circuit 467 asserts an up signal (UP) or down signal (DN). If there is no early/late majority, neither the up signal nor the down signal is asserted. So long as a calibration signal 474 (CAL) from the application logic 455 remains deasserted, the up and down signals, when asserted, pass through AND gates $468_1$ and $468_2$, respectively, to up/down inputs of mix logic 471.

The mix logic circuit 471 receives a set of phase vectors 472 (i.e., clock signals) from a reference loop circuit 470. The phase vectors have incrementally offset phase angles within a cycle of a reference clock signal (REF CLK). For example, in one embodiment, the reference loop outputs a set of eight phase vectors that are offset from one another by 45 degrees (i.e., choosing an arbitrary one of the phase vectors to have a zero degree angle, the remaining seven phase vectors have phase angles of 45, 90, 135, 180, 225, 270 and 315 degrees). The mix logic 471 maintains a phase count value which includes a vector select component to select a phase-adjacent pair of the phase vectors (i.e., phase vectors that bound a phase angle equal to 360°/N, where N is the total number of phase vectors), and an interpolation component (INT) which is output to a mixer circuit 473 along with the selected pair of phase vectors (V1, V2). The mixer circuit mixes the selected pair of phase vectors according to the interpolation component of the phase count to generate complementary edge clock signals and complementary data clock signals that collectively constitute the receive clock signal.

The mix logic 471 increments and decrements the phase count value in response to assertion of the up and down signals, respectively, thereby shifting the interpolation of the selected pair of phase vectors (or, if a phase vector boundary is crossed, selecting a new pair of phase vectors) to incrementally retard or advance the phase of the receive clock signal. For example, when the phase control logic 467 determines that the edge clock leads the data transition and asserts the up signal, the mix logic 471 increments the phase count, thereby incrementing the interpolation component of the count and causing the mixer to incrementally increase the phase offset (retard the phase) of the receive clock signal. At some point, the phase control signal output begins to dither between assertion of the up signal and the down signal, indicating that edge clock components of the receive clock signal have become phase aligned with the edges in the incoming data signal.

The equalizer clock generator 459 receives the phase vectors 472 from the reference loop 470 and includes mix logic 481 and an equalizer clock mixer 483 that operate in the same manner as the mix logic 471 and receive clock mixer 473 within the CDR circuit 457. That is, the mix logic 481 maintains a phase count value that is incrementally adjusted up or down in response to the up and down signals from the phase control circuit 467. The mix logic selects a phase-adjacent pair of phase vectors 472 based on a vector select component of the phase count, and outputs the selected vectors (V1, V2) and interpolation component of the phase count (INT) to the equalizer clock mixer 483. The equalizer clock mixer 483 mixes the selected vectors in accordance with the interpolation component of the phase count to generate the equalizer clock signal, EQCLK. The equalizer clock signal, which may include complementary component clock signals, is output to the equalizing output driver 465 (or other type of equalization circuit as described above) to time the output of equalizing signals onto signal path 122.

The equalizer data source selector 463 is responsive to the calibration signal 474 to select either the tap selector 461 (which operates as described above to select data tap values from the shift register 453 and/or one or more parallel registers) or the signal generator 462 that outputs clock pattern 10101010 (e.g., a bi-stable storage element that toggles between states in response to each EQCLK transition). When the calibration signal 474 is low, the equalization data source selector 463 selects the tap selector 461 to supply selected data values to the equalizing output driver 465. When the calibration signal 474 is high, the receiver 450 enters a calibration mode in which the signal generator 462 is selected to supply the clock pattern to the equalizing output driver 465. Also, in calibration mode, the high state of the calibration signal 474 disables AND gates $468_1$ and $468_2$ from passing the up and down signals to the mix logic 471. Thus, the phase count within the CDR circuit remains unchanged in calibration mode, while up and down signals generated by the phase control circuit 467 are used to increment and decrement the phase count value within the mix logic 481. In one embodiment, no signals are transmitted on the signal path 122 while the receiver 450 is in calibration mode, so that the only signal present at the input of the sampling circuit 451 is the clock pattern output by the equalizing output driver 465. By this arrangement, edge and data samples corresponding to the clock pattern are captured in the shift register 453 and supplied to the phase control circuit 467 to determine whether the receive clock signal (RCLK) is early or late relative to the clock pattern samples. Accordingly, the phase control circuit 467 will assert an up or down signal (as the case may be) to adjust the phase of the receive clock signal relative to the incoming data stream. Because the receive clock phase is effectively locked, however (i.e., by operation of the AND gates 468), only the phase count within the equalization clock generator will be adjusted. Thus, the normal-mode CDR operation is effectively carried out in reverse while the receiver 450 is in calibration mode. Instead of shifting the phase of the receive clock signal to achieve alignment with transitions in the incoming data signal, the phase of the equalizer clock signal is shifted to align transitions in the incoming data signal (i.e., the clock pattern output by the equalizing output driver) with the receive clock signal. By this operation, the equalizer clock signal is advanced relative to an edge clock component of the receive clock signal by a time substantially equal to the clock-to-Q delay of the equalizing output driver 465. Thus, the overall effect of the calibration mode operation is to advance the phase of the equalization clock according to the clock-to-Q time of the equalizing output driver as shown in FIG. 30. In this way, the equalizing output driver 465 drives an equalizing signal onto the signal path 122 in phase alignment with the incoming data signal.

In one embodiment, the calibration signal 474 is asserted for a time interval previously determined to be sufficient to achieve phase alignment between transitions in the transmitted clock pattern and the edge clock component of the receive clock signal. Alternatively, the up and down signals generated by the phase control circuit may be monitored in the calibration mode to determine when the up and down signals begin to alternate, thereby indicating that the desired phase alignment has been obtained. In either case, after phase alignment has been obtained, the calibration signal is deasserted to enable normal operation of the receive circuit. At this point, the CDR circuit returns to adjusting the phase count within mix logic 471 in response to the up and down signals from the phase control circuit 467. Because the mix logic 481 within the equalizer clock generator 459 continues to respond to the same up and down signals, the phase offset between the equalizer clock signal and the receive clock signal (i.e., the phase offset established in the calibration mode) is maintained as the phases of the two clocks are adjusted. Thus, in normal-mode operation, the equalizer clock signal and receive clock signal retain the phase offset established in calibration mode, but otherwise track one another.

It should be noted that signal patterns other than the clock pattern 1010101 may be generated by the signal generator 462 and used to achieve the desired phase relationship between the equalizer clock signal and the receive clock signal. For example, the signal generator may be implemented by a pseudo random bit sequence (PRBS) generator that generates a pseudo random bit sequence. More generally, any signal generator, random or otherwise, that generates a sequence of values having a sufficient transition density (i.e., transitions per unit time) to enable phase locking in the equalizing receiver 450 (i.e., phase locking between transitions in the waveform output by output driver 465 and the receive clock signal) may be used to implement signal generator 462.

Determination of Equalization Tap Latencies, Weights and Polarities

Referring again to FIG. 3, tap selection logic may be implemented in a number of different ways. In one embodiment, for example, the tap select logic 139 includes a configuration circuit that may be programmed with configuration information that specifies the tap data sources to be selected by select circuit 128. The configuration circuit may include a nonvolatile memory, fusible circuit, etc. that is programmed at production time according to the symbol latency, amplitude and polarity of empirically observed (or analytically determined) distortions. Alternatively, the configuration circuit may include memory (volatile or nonvolatile) which is initialized with predetermined configuration information during system startup. In yet another embodiment, referred to herein as a self-calibrating embodiment, a signaling system includes circuitry to automatically determine the symbol latency, amplitude and polarity of distortions on the signaling path between a transmitter and receiver, and to program a configuration circuit within the tap select logic with configuration information that indicates the tap data sources to be selected by a select circuit and the tap weights and polarities to be applied by an equalization circuit.

In one self-calibrating embodiment of the invention, a technique called embedded scoping is used to determine the symbol latency, amplitude and polarity of signal path distortions. The symbol latency of a given distortion, once known, is used to select one or more tap data values having corresponding symbol latencies, and the distortion amplitude and polarity are used to determine the weight and polarity to be applied to the selected tap data value in generating an equalization response. Also, the symbol latency of a given distortion may be used to determine whether to counteract the distortion through transmitter preemphasis or receiver equalization (or both), and the overall range of symbol latencies for detected distortions may be used to determine an appropriate dead range for the signaling system.

Embedded scoping involves iteratively receiving a sequence of symbols in a receiver and comparing the received symbol sequence with a local generation of the sequence to confirm error-free reception. With each receive-and-confirm iteration, a threshold voltage used to distinguish between symbol values in the incoming signal is offset from a calibrated level by a progressively larger amount until a symbol in the sequence no longer matches the expected value. The threshold voltage offset at which the failure occurs is referred to herein as a pass/fail offset and represents a measure of the signal level at the sampling instant at which the failure occurred. Thus, by sweeping the threshold voltage through a range of threshold voltages until the pass/fail offsets for each symbol in the symbol sequence have been detected, a sample plot for the incoming signal may be developed. Further, by sweeping the receive clock signal through an incremental sequence of phase offsets, and determining the pass/fail offset at each phase offset, a complete trace of the incoming signal may be generated. Also, the granularity and start stop points of the phase offsets and/or threshold voltage steps may be controlled (e.g., by configuring a programmable circuit or register) to enable the waveform trace to be constrained to selected points of interest in the incoming signal (e.g., $\pm N°$ from an intended sampling instant, N representing a sweep angle).

Figure 32:
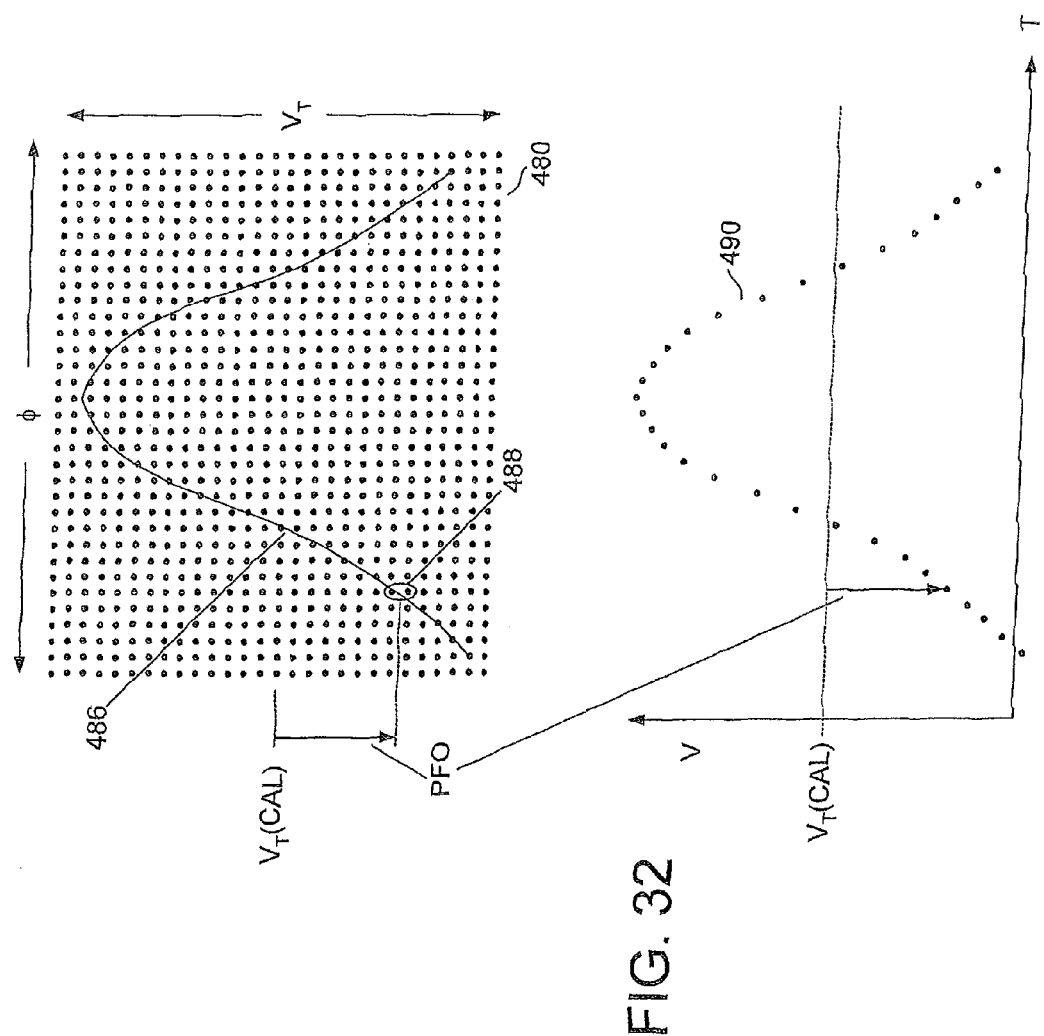
FIG. 32 illustrates the use of embedded scoping to generate a trace of a data signal over a single symbol time.

FIG. 32 illustrates the use of embedded scoping to generate a time-based trace 490 of an incoming data signal 486. The range of threshold voltage offsets over which the incoming signal 486 is sampled is indicated by $V_T$, and the range of phase offsets at which the signal is sampled is indicated by $\phi$. Each sample point within the sweep is indicated by a respective dot within a grid of sample points 480. Note that the sweep may be obtained by stepping the voltage threshold through the range of $V_T$ values for each value of $\phi$, or, alternatively, by stepping the clock phase through the range of $\phi$ values for each value of $V_T$.

Still referring to FIG. 32, 488 indicates a pair of samples for which a pass/fail condition is detected. A corresponding pass/fail offset (PFO) is determined according to the difference between the calibrated $V_T$ level ($V_T$(CAL)) and the average of the $V_T$ offsets between the pass and fail samples, and recorded as a measure of the incoming signal. That is, the pass/fail offset may be used to establish a data point within the trace 490 as shown. After sweeping through all the sample points within the grid 480 (which sweep may be repeated numerous times to obtain an average and to discard statistical outliers), a measure of the incoming signal is obtained as illustrated graphically by the trace 490.

Embedded scoping has a number of benefits over traditional signal measurement techniques. First, because the technique is non-invasive (i.e., no probe contact), the electrical characteristics of the system under test are unaltered, thereby yielding potentially more accurate results. Also, the trace is generated from the perspective of the receive circuit itself, meaning that any non-ideal characteristics of the receive circuit are accounted for in the resulting signal trace information. Finally, because all components needed for embedded scoping may be included within a finished signaling system, embedded scoping may be used to perform numerous run-time analyses, including determining the latency and amplitude of reflections and other distortions within the signaling system.

Figure 33:
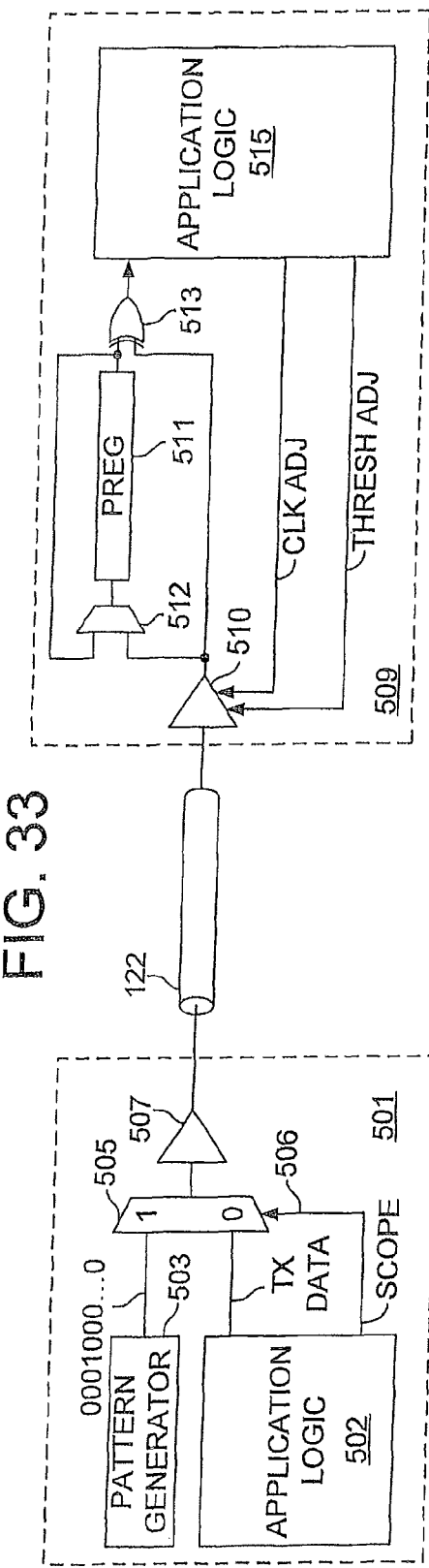
FIG. 33 illustrates an embodiment of a signaling system that employs embedded scoping to determine equalizer tap selections, tap weights and tap polarities.

FIG. 33 illustrates a signaling system 500 according to an embodiment of the invention. The signaling system 500 includes a receive device 509 and transmit device 501 that employ embedded scoping to determine equalizer tap selections, tap weights and tap polarities. The transmit device 501 includes a pattern generator 503, data selector 505, equalizing transmitter 507 and application logic 502. The application logic 502 performs the core function of the transmitting device (e.g., signal processing, instruction processing, routing control, or any other function) and provides transmit data (TX DATA) to a first input of the data selector 505. During normal operation, the application logic 502 outputs a logic low scope signal 506 (SCOPE) to the data selector 505 to select the transmit data to be passed to the equalizing transmitter 507 for transmission to the receive device 509 via signal path 122 (which may include or be connected to numerous sources of discontinuity such as connectors, vias, stubs, etc.). During a scoping mode of operation, the application logic 502 drives the scope signal 506 high to enable a scoping mode of operation within the transmit circuit 501. In the scoping mode, the data selector 505 selects a repeating single-symbol pulse sequence (e.g., a test signal such as: 00100 . . . 00100 . . . 00100 . . . ) generated by the pattern generator 503 to be transmitted to the receive device 509. The receive device 509 includes an equalizing receiver 510 to receive the incoming data signal, a pattern register 511 to store a local version of the single-symbol pulse sequence, a multiplexer 512 to enable the pattern register 511 to be switched between load and barrel-shifting modes, a XOR gate 513 to compare the received data sequence with the locally generated sequence, and application logic 515 (or other logic) to generate a clock adjust signal (CLK ADJ) and threshold voltage adjust signal (THRESH ADJ) to sweep the receive clock and threshold voltage used within the equalizing receiver through their scoping ranges. The application logic 515 additionally builds a trace record (i.e., data indicative of the incoming data sequence) based on the output of XOR gate 513.

When the receive device 509 is in a scoping mode of operation, the multiplexer 512 is initially set to load the pattern register 511 with the output of the equalizing receiver 510. After a desired sequence of data (e.g., the single-symbol pulse sequence) is shifted into the pattern register 511, the multiplexer 512 is set to enable the barrel-shifting mode of the pattern register 513. That is, the multiplexer 512 selects the output of the pattern register 511 to be fed back to the input of the pattern register 511 so that the contents of the pattern register 511 are continuously rotated through the pattern register 511 (i.e., a barrel shifting operation). By this arrangement, the data sequence loaded into the pattern register 511 is repeatedly output, bit by bit, to a first input of the XOR gate 513. The data sequence received by the equalizing receiver is input to a second input of the XOR gate 513 so that the received data sequence is compared, bit by bit, with the data sequence stored within the pattern register 511. By selecting the length of the repeatedly transmitted data sequence to match the storage size of the pattern register 511, the pattern register contents are repeatedly compared with a newly received version of the same data sequence (i.e., putatively the same data sequence). Any reception error will result in a mismatch between the received value and the corresponding value within the pattern register and therefore, when compared by XOR gate 513, will result in an error signal being output from the XOR gate 513 to the application logic 515. The application logic 515 may then record the adjusted threshold voltage and clock phase offset at which the error occurred to a signal level for a timing offset within a waveform trace.

Figure 34:
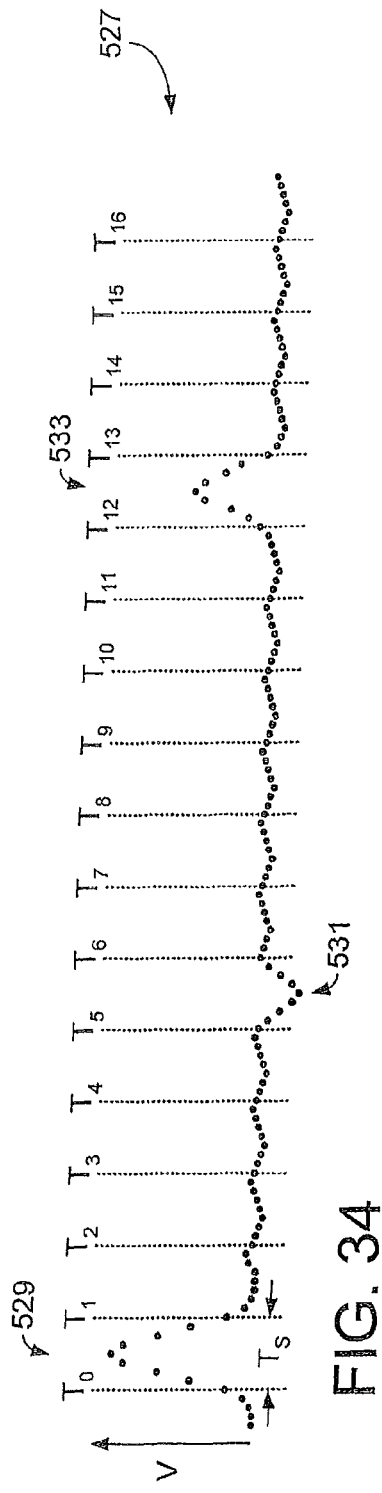
FIG. 34 illustrates an exemplary trace record for a pulse waveform captured by an embedded scope within the signaling system of FIG. 33.

FIG. 34 illustrates an exemplary waveform trace 527 of a pulse data sequence captured by an embedded scope within the signaling system of FIG. 33. As shown, a primary pulse 529 arrives at the receiver at symbol time, $T_0$; a negative reflection 531 of the primary pulse appears at symbol time $T_5$ and a positive reflection 533 appears at symbol time $T_{12}$. Thus, referring to FIG. 33, the application logic 515 of receiver 509 may store configuration information in a select logic circuit within the equalizing receiver 510 (or elsewhere within the receive device 509) to enable selection of stored data values having symbol latencies of five and twelve symbol times as tap data sources for an equalizing circuit. Alternatively, the application logic 515 may directly output select signals to select the desired stored data values as tap data sources. The application logic 515 may also generate tap weights and tap polarity values in accordance with the amplitude and polarity of the distortions 531 and 533, and store or output the weights and polarity values as necessary to apply the appropriate tap weights and polarities within the equalizing receiver 510.

Figure 35:
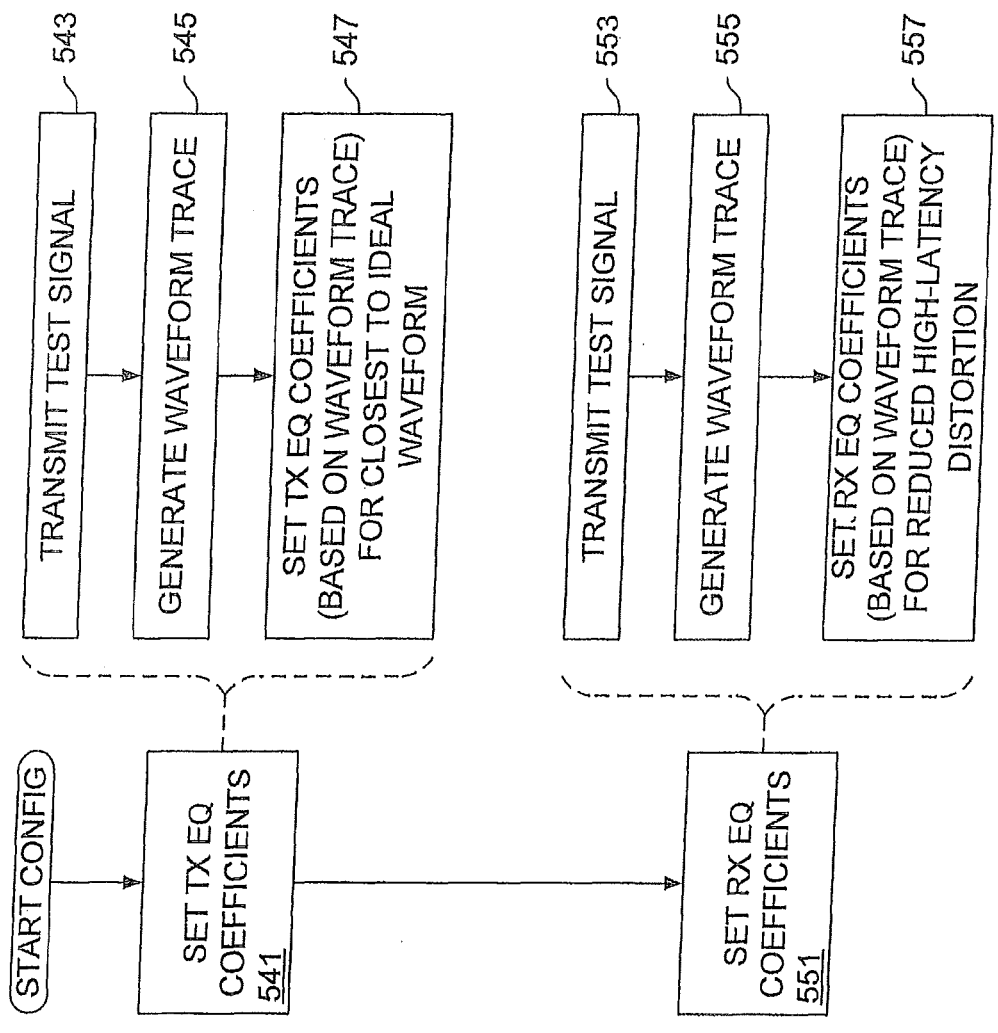
FIG. 35 illustrates a method of setting equalization coefficients in a signaling system according to the invention.

FIG. 35 illustrates a method of setting equalization coefficients in a signaling system according to the invention. In the embodiment shown, transmit-side equalization coefficients are set first (541), then receive-side equalization coefficients are set (551). The transmit-side coefficients are set by transmitting a test signal at 543 (e.g., a pulse signal, step, etc.), then generating a waveform trace (545) using the embedded scoping techniques described above. The transmit-side equalization coefficients, including tap data sources, tap weights and tap polarities, are then set at 547 to produce a received waveform trace that most closely corresponds to the ideal waveform (e.g., pulse, step, etc.) output by the transmitter. The transmit-side equalization coefficients may be determined analytically (i.e., by computing the coefficients based on the waveform trace generated at 545) or iteratively, by repeating operations 543 and 545 for different combinations of coefficient settings until a coefficient setting that provides a desired waveform is determined.

After the transmit-side equalization coefficients have been set, the receive-side coefficients are set by transmitting the test signal at 553 (i.e., a pulse, step or other signal transmitted with equalization according to the coefficients set at 547), then generating a waveform trace of the received waveform (555) using the embedded scoping techniques described above. The receive-side equalization coefficients, including tap data sources, tap weights and tap polarities, are then set at 557 to produce a received waveform that most closely corresponds to the ideal waveform (i.e., waveform having reduced high-latency distortion). The receive-side equalization coefficients may be determined analytically as described in reference to FIGS. 31-33, or iteratively, by repeating operations 553 and 555 for different combinations of coefficient settings until a coefficient setting that provides a desired waveform is determined.

Note that selection of tap data sources within the transmitter may include outputting test signals on neighboring signal paths simultaneously with the test signal transmission at 543 to allow determination of which transmit-side equalizer taps, if any, should be sourced by cross-talk cancellation data values (i.e., data values being transmitted on neighboring signal paths) and the corresponding tap weights.

Reducing Equalization Taps Through Path Length Symmetry

As discussed above in reference to FIG. 3, the tap select logic 139 and select circuit 128 enable equalization over a relatively wide range of symbol latencies using a small number of equalizer taps. In embodiments of the invention, the total number of equalizer taps is further reduced through symmetry in the electrical distances between signal path discontinuities.

Figure 36:
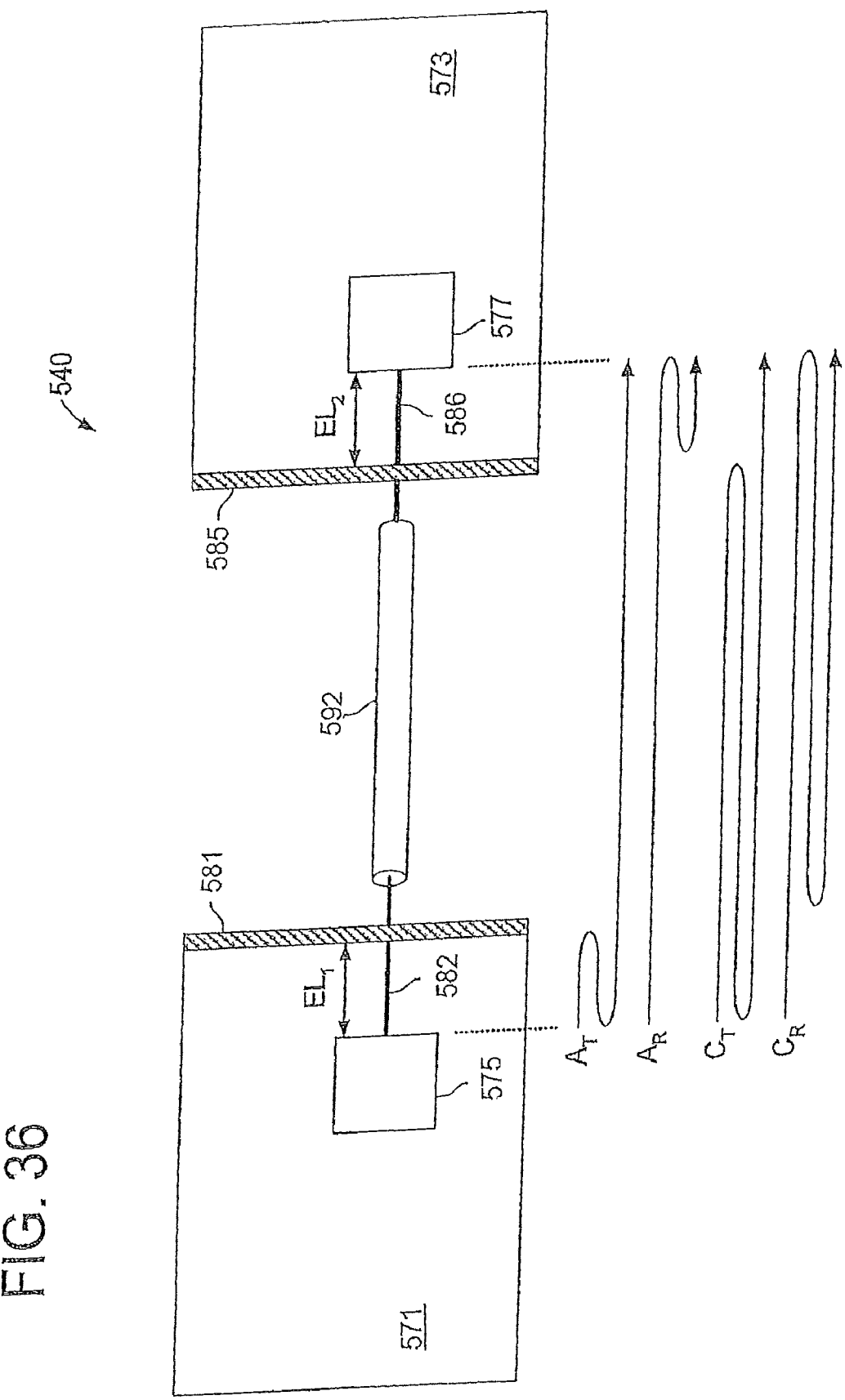
FIG. 36 illustrates a signaling system that employs path length symmetry to reduce the total number of equalization taps needed to compensate for reflection-type ISI.

FIG. 36 illustrates a signaling system that employs path length symmetry to reduce the total number of equalization taps needed to compensate for reflection-type ISI. The system includes a pair of circuit boards 571 and 573 (e.g., line cards, port cards, memory modules, etc.) having integrated circuit (IC) devices 575 and 577 mounted respectively thereon. IC device 575 includes a transmit circuit coupled to a connector interface 581 (e.g., a connector or a terminal to be received by a connector) via signal path segment 582, and IC device 577 includes a receive circuit coupled to a connector interface 585 via signal path segment 586. The connector interfaces 581 and 585 are coupled to one another through signal path segment 592 (e.g., backplane trace, cable, etc.) to form an overall signal path between the transmit circuit and receive circuit.

Because the connector interfaces 581 and 585 tend to have at least slightly different impedances than the impedance of path segments 582, 586 and 592, reflections are produced at connector interfaces as shown by reflection flight paths $A_T$, $A_R$, $C_T$ and $C_R$. More specifically, the reflection flight path indicated by $A_T$ results from the primary signal reflecting off connector interface 581, and the reflection reflecting off the output node of the transmit circuit within IC 575. Thus, the reflection flight time over path $A_T$ exceeds the unreflected primary signal flight time by twice the signal propagation time between the connector interface 581 and the transmit circuit output node; i.e., the signal propagation time on path segment 582. Similarly, the reflection flight time over path $A_R$ (reflection off receiver input, then off connector interface 585) exceeds the unreflected primary signal flight time by twice the signal propagation time between the connector interface 585 and the receive circuit input; the signal propagation time on path segment 586. Accordingly, if path segments 582 and 586 are designed or calibrated to have equal electrical lengths (i.e., equal signal propagation delays), reflections $A_T$ and $A_R$ will arrive at the input of the receive circuit of IC device 577 at substantially the same time. Consequently, a single equalization tap having a symbol latency that corresponds to the latent arrival of the coincident $A_T/A_R$ reflections may be used to cancel or at least reduce both reflections. Because reflection flight paths $C_T$ and $C_R$ are made equal by equalizing the electrical lengths of path segments 582 and 586, a single equalization tap that corresponds to the latent arrival of coincident $C_T/C_R$ reflections may be used to cancel or at least reduce both reflections. Thus, by designing or calibrating path segments 582 and 586 to have equal electrical lengths (which path segments may optionally include an on-chip path segment between the transmit circuit output and an IC device 575 output node and/or an on-chip path segment between the receive circuit input and an IC device 577 input node), one equalization tap within either the transmit circuit or receive circuit may be used to cancel or reduce a distortion that would otherwise require two or more taps.

In one embodiment, the electrical lengths of path segments 582 and 586 are made equal (or substantially equal—as achievable through practicable manufacturing techniques) by design which may include, but is not limited to: 1) making the physical lengths of path segments 582 and 586 substantially equal, whether implemented by printed traces, cables or other types of conductors; 2) including inductive or capacitive structures (e.g., vias, ferrite materials, narrowed or widened trace regions, or any other impedance-altering structures) statically coupled in series or parallel with path segments 582 and/or 586 to equalize otherwise different electrical lengths of the path segments; and/or 3) including inductive and/or capacitive structures that may be run-time coupled (e.g., through pass gates or other electrically or magnetically controllable structures) in series or parallel with path segments 582 and/or 586 to equalize otherwise different electrical lengths of the path segments. More generally, any technique for adjusting the electrical lengths of path segments 582 and 586 to achieve coincident arrival of two or more signal reflections at the input of an equalizing receiver may be used without departing from the spirit and scope of the present invention.

Regarding run-time coupling of impedance-altering structures to path segments 582 and/or 586, such impedance-altering structures may be selectively coupled to path segments 582 and/or 586 through operation of a configuration circuit (e.g., volatile or non-volatile storage, or fusible or otherwise one-time programmable circuit). For example a configuration value that corresponds to the desired electrical length of a path segment may be programmed into the configuration circuit and used to control pass gates or other switching elements for switchably coupling the impedance-altering structures to the path segment. The desired setting of the configuration value may be determined, for example, by using the embedded scoping technique described above in reference to FIGS. 27-29 to determine relative arrival times of signal reflections and therefore propagation time differences between signal reflections.

Although the invention has been described with reference to specific exemplary embodiments thereof, it will be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a sampler to obtain a plurality of historical data values from an input signal;
   a plurality of storage locations to store the plurality of historical data values; and
   a filter having a tap selectively coupled to any one of the plurality of storage locations as determined by a select value, the filter to output a signal used to alter a signal level of the input signal.

2. The apparatus of claim 1 wherein the filter includes:
   a tap select logic to provide a select signal in response to the select value;
   a select circuit having the tap, the select circuit to output a subset of historical data values in response to the select signal; and
   an equalization circuit to adjust the signal level that corresponds to a data signal in the input signal in response to the subset of historical data values.

3. The apparatus of claim 2 wherein the plurality of storage locations is a shift register and the tap select logic is a configuration circuit to store the select value.

4. The apparatus of claim 2 wherein the equalization circuit includes:
   an output driver to output an equalization signal onto a signal path to adjust the signal level that corresponds to the data signal transmitted on the signal path, the equalization signal having an amplitude according to the subset of historical data values.

5. The apparatus of claim 4 wherein the output driver outputs the equalization signal in response to an equalization clock signal and the sampler obtains the plurality of historical data values in response to a sample clock signal.

6. The apparatus of claim 2 wherein the equalization circuit includes:
a pre-amplifier having an input and an output coupled to a signal path, wherein the signal used to alter the signal level is provided to the input of the pre-amplifier.

7. The apparatus of claim 2 wherein the equalization circuit includes:
a pre-amplifier coupled to a signal path, wherein the signal used to alter the signal level is provided to the preamplifier to adjust the amplification of the signal level.

8. The apparatus of claim 2 wherein the equalization circuit includes:
a level shifter coupled to an input of the sampler, wherein the signal used to alter the signal level is provided to the level shifter to adjust the signal level.

9. The apparatus of claim 2 wherein the filter includes:
a configuration circuit to store the select value and to output the select value to the select circuit, the select value being output to the select circuit as a plurality of signals.

10. The apparatus of claim 9 wherein the configuration circuit systematically steps the select value through a sequence of test values to determine a setting of the select value that corresponds to the subset of historical data values.

11. The apparatus of claim 10 wherein the configuration circuit determines, for each test value in the sequence of test values, a measure of correctly received historical data values.

12. The apparatus of claim 11 wherein the configuration circuit sets the select value according to the test value for which the measure of correctly received historical data values is highest.

13. The apparatus of claim 9 wherein the configuration circuit adjusts the select value in accordance with the subset of historical data values.

14. The apparatus of claim 3 wherein the equalization circuit adjusts the signal level in accordance with the subset of historical data values and a plurality of weight values that correspond respectively to the subset of historical data values.

15. The apparatus of claim 14 wherein the configuration circuit outputs the plurality of weight values to the equalization circuit.

16. The apparatus of claim 15 wherein the configuration circuit steps at least one of the plurality of weight values through a sequence of test weight values in a calibration operation.

17. The apparatus of claim 2 wherein the equalization circuit adjusts the signal level in accordance with the subset of historical data values and a plurality of weight values that correspond respectively to the subset of historical data values.

18. The apparatus of claim 17 further comprising a configuration circuit coupled to output the plurality of weight values to the equalization circuit.

19. The apparatus of claim 18 wherein the configuration circuit steps at least one of the plurality of weight values through a sequence of test weight values in a calibration operation.

20. The apparatus of claim 19 wherein the configuration circuit determines, for each test weight value in the sequence of test weight values, a measure of correctly received historical data values.

21. The apparatus of claim 20 wherein the configuration circuit sets the at least one of the plurality of weight values in accordance with the test weight value for which the measure of correctly received historical data values is highest.

22. The apparatus of claim 21 wherein the configuration circuit adjusts at least one of the plurality of weight values in accordance with the subset of historical data values.

23. The apparatus of claim 2 wherein the equalization circuit adjusts the signal level in accordance with the subset of historical data values and a plurality of polarity values that correspond respectively to the subset of historical data values, each polarity value indicating whether a corresponding data value within the subset of historical data values provides a positive or negative contribution to the signal level.

24. A method of operation in an integrated circuit, the method comprising:
sampling an input signal to obtain a plurality of historical data values;
storing the plurality of historical data values in a plurality of storage locations in the integrated circuit;
selecting a tap from any one of the plurality of storage locations as determined by a select value; and
outputting a signal used to alter a signal level of the input signal.

25. The method of claim 24 wherein the selecting and outputting is performed by a filter.

26. The method of claim 24 wherein the storing includes storing the plurality of historical data values in a shift register.

27. The method of claim 24 wherein the outputting includes outputting a signal based on a subset of historical data values to an equalization circuit that adjusts the signal level of the input signal.

28. The method of claim 24 further comprising storing the select value in a configuration circuit.

29. The method of claim 24 further comprising determining the select value from a plurality of test values and a subset of the historical data values.

30. The method of claim 24 further comprising programming the select value.

* * * * *